(12) United States Patent
Farbotnik et al.

(10) Patent No.: US 6,742,619 B2
(45) Date of Patent: Jun. 1, 2004

(54) ENGINE MOUNTS, SUCH AS FOR A SKID STEER LOADER, HAVING INTERNALLY SNUBBED SHOCKS AND VIBRATION ISOLATORS, AND A METHOD OF MAKING THE ENGINE MOUNTS

(75) Inventors: Don Farbotnik, Cambridge Springs, PA (US); Derek Roworth, Tyler, TX (US)

(73) Assignee: Trelleborg AB, Trelleborg (SE)

( * ) Notice: Subject to any disclaimer, the term of this patent is extended or adjusted under 35 U.S.C. 154(b) by 0 days.

(21) Appl. No.: 09/970,214

(22) Filed: Oct. 3, 2001

(65) Prior Publication Data

US 2003/0150663 A1 Aug. 14, 2003

(51) Int. Cl.[7] .............................................. B62D 21/00

(52) U.S. Cl. ...................... 180/312; 180/299; 267/293

(58) Field of Search ................... 180/312, 311, 180/299, 6.48, 6.58, 298, 300, 291, 902; 267/293, 294, 140.5, 141.1, 141.3, 140.13, 141.2

(56) References Cited

U.S. PATENT DOCUMENTS

| | | | | | |
|---|---|---|---|---|---|
| 2,295,829 | A | * | 9/1942 | Carlson | 267/141.1 |
| 2,582,998 | A | * | 1/1952 | Lee | 267/140.13 |
| 2,781,990 | A | * | 2/1957 | Via | 267/293 |
| 4,161,304 | A | * | 7/1979 | Brenner et al. | 267/140.13 |
| 4,721,291 | A | * | 1/1988 | Makibayashi et al. | 267/140.13 |
| 4,837,694 | A | * | 6/1989 | Narita et al. | 180/6.48 |
| 5,722,674 | A | | 3/1998 | Dawson | |
| 5,743,509 | A | * | 4/1998 | Kanda et al. | 267/141.2 |
| 5,832,729 | A | | 11/1998 | Reid et al. | |
| 5,842,677 | A | * | 12/1998 | Sweeney et al. | 267/293 |
| 6,109,858 | A | * | 8/2000 | Deneve et al. | 414/685 |
| 6,354,578 | B1 | * | 3/2002 | Nakatsukasa et al. | 267/293 |

* cited by examiner

Primary Examiner—Brian L. Johnson
Assistant Examiner—Hau Phan
(74) Attorney, Agent, or Firm—Nils H. Ljungman & Associates

(57) ABSTRACT

A skid steer loader and like off-road vehicles with engine mounts having internally snubbed shocks and vibrations isolators, particularly for mounting three and four cylinder engines. The engine mount provides for minimized damage due to shocks from the chassis to the engine and due to vibrations from the engine to the chassis.

8 Claims, 9 Drawing Sheets

ENGINE MOUNTS, SUCH AS FOR A SKID STEER LOADER, HAVING INTERNALLY SNUBBED SHOCKS AND VIBRATION ISOLATORS, AND A METHOD OF MAKING THE ENGINE MOUNTS

BACKGROUND OF THE INVENTION

1. Field of the Invention

The present invention relates to a skid steer loader and like off-road vehicles with engine mounts having internally snubbed shocks and vibrations isolators, particularly for mounting three and four cylinder engines and for minimizing shocks from the chassis to the engine and vibrations from the engine to the chassis.

2. Background Information

U.S. Pat. No. 5,722,674 illustrates a skid steer loader typical of an off-road construction vehicle, having an eccentric axle housing which permits the use of common components to construct skid steer loaders with different wheel base lengths. The skid steer loader comprises wheels supported in a support frame or chassis. The frame also supports a housing which accommodates a power unit which may possibly be a three or four cylinder engine.

Due to the nature of their working environment of rugged terrain, off-road vehicles and particularly engines thereof are subjected to considerable stress in terms of shocks and vibrations.

In general terms, means to counteract shocks and vibrations are disposed between first and second components, such as for example, to minimize shocks from a chassis to an engine and to minimize vibrations from an engine to a chassis.

Vibrations isolators, or like resilient mountings, serve, inter alia, for connecting two components, for example, for connecting a cab structure to a vehicle main frame and to diminish vibrations between the cab structure and the vehicle main frame by being disposed between the cab structure and the vehicle main frame. Other applications of vibrations isolators comprise the mounting of engines to the vehicle frame with attendant reduction of detrimental vibrations between the vehicle frame and the engine due to the vibrations isolator being disposed between an engine and the vehicle frame. The foregoing comprise applications that relate to moving vehicles, however, vibrations isolators are also of use in stationary applications such as in compressors, pumps and generators.

Furthermore, moving vehicles such as automobiles, trucks, aircraft, missiles, ships and rail vehicles carry components that require protection against severe shocks from impact caused by rough terrain or other disturbances as the case may require. Such components include vehicle electronics, motors, fans, machinery, transformers, shipping containers, railroad equipment, pumps, numerical control equipment and aircraft/missile electronics. Generally such protection is provided by a shocks and vibrations isolator or like component.

One function of a vibrations isolator is to provide a means whereby a component is protected against handling impact loads being transmitted from a further component, such as, for example, a base or frame of a vehicle such as an aircraft on which the component may be mounted. Protection against such loads is usually accomplished by storing energy within a resilient medium and then releasing such energy at a relatively slower rate. Generally, such isolators comprise a rubber member which, together with the mass of the mechanism which it supports, has a natural frequency that is sufficiently lower from that of the disturbing force so as to bring about a minimum transient response of the supported mechanism, and yet have sufficient static load-carrying capacity to support the load of such mechanism. Correct matching of a vibrations isolator to specific application is essential; for example, a given vibrations isolator may be effective in a case where the mechanism is to be subjected to a relatively high magnitude of loading within a short time interval and yet may tend to magnify the shocks where the mechanism is to be subjected to a loading of considerably smaller magnitude but with a longer time interval.

In many applications the vibrations isolators will experience all the modes of loading or combinations thereof. In particular, the vibrations isolator will not only have to support the protected component, but will also have to hold it to the structure wherein the vibrations isolator is in tension or help the protected component from shifting wherein the vibrations isolator is in shear.

This invention is directed to the case wherein various types of loads including compression, shear or tension modes and shocks and vibrations or combinations thereof are incurred by the vibrations isolator. Furthermore, it would be advantageous to have one mount design that could simultaneously accommodate all possible modes of loads.

One type of vibrations isolator used to support protected components that incur various types of loads has an inner, intermediate and outer rigid members with a first elastomer disposed between the inner and intermediate members and a second elastomer disposed between the intermediate and outer members wherein the elastomeric members are not bonded to the rigid members. As a result of the lack of bonding, dynamic characteristics are not truly predictable since they vary due to rubber to metal interface slippage conditions such as moisture, oil contamination, surface roughness, etc. Furthermore such unbonded mounts accommodate loads primarily in elastomeric compression. As such, there are response abnormalities associated with first or second elastomeric sections lifting off at higher dynamic excursions.

OBJECT OF THE INVENTION

It is an object of the present invention to provide a skid steer loader, and the like off-road vehicles, with an engine mount, particularly for mounting three and four cylinder engines against shocks from the chassis and vibrations from the engine to the chassis.

It is also an object of the present invention to provide an economic yet effective shocks and vibrations isolator or engine mount which can serve as resilient connection and to minimize shocks from a chassis to an engine and vibrations of an engine to a chassis.

SUMMARY OF THE INVENTION

The invention teaches that these objects can be accomplished by a s skid steer loader, comprising a utility vehicle configured to maneuver in confined spaces, said skid steer loader comprising: a body comprising a chassis having a forward portion and a rearward portion, a first side and a second side; a first upright tower portion on said first side near said rearward portion; a second upright tower portion on said second side near said rearward portion; an operator's cab mounted to said chassis; a first set of wheels at said first side, said first set comprising a forward wheel and a rearward wheel; a second set of wheels at said second side, said second set comprising a forward wheel and a rearward wheel; said first and second tower portions being disposed rearward of the centers of said rear wheels; an engine, such as, a three-cylinder engine or a four-cylinder engine, mounted to said chassis between said upright tower portions and rearward of the centers of said rear wheels; a first transmission configured and disposed to drive said first set of wheels on said first side in forward and backward direction; a second transmission configured and disposed to drive said second set of wheels on said second side in forward and backward direction; said first transmission and said second transmission together being configured to turn said first set of wheels driving in one direction and to turn said second set of wheels driving in the opposite direction; left and right interconnected lift arm assemblies each comprising: a lift arm pivotally connected with the corresponding tower portion of said body at a lift arm pivot point located a first horizontal distance rearward of the centers of said front wheels; and a lift actuator connected between said body ad said lift arm, said lift actuator being connected with said lift arm at a fixed second distance from said lift arm pivot point and connected with the tower portion of said body elevationally higher than said rear wheel at a lift actuator pivot point; a material-moving implement pivotally connected with said lift arm assemblies about an implement pivot axis located at a distance from said lift arm pivot points; and at least one implement tilt actuator connected between at least one of said lift arm assemblies and said implement; said implement and said chassis being configured to dispose the center of gravity to the rear of said loader upon said loader being unladened to thereby dispose a first center of steering between said rear wheels and thus to permit said front wheels to skid around said first center of steering; said implement and said chassis being further configured to dispose the center of gravity to the front of said loader upon said loader being laden to thereby dispose a second center of steering between said forward wheels and thus to permit said rear wheels to skid around said second center of steering; at least one engine mount comprising: a first securement arrangement being configured and disposed to operably secure each said at least one engine mount to said chassis; a second securement arrangement being configured and disposed to operably secure each said at least one engine mount to said engine; a first elastomeric body assembly and a second elastomeric body assembly; said first elastomeric body assembly comprising a first elastomeric material comprising a first Shore A durometer value within a first predetermined range; said second elastomeric body assembly comprising a second elastomeric material comprising a second Shore A durometer value within a second predetermined range; said first elastomeric body assembly and said second elastomeric body assembly both being configured together as a unit to minimize vibrations from said engine to said chassis; and at least one rigid element operably connected to one of: said first securement arrangement and said second securement arrangement; said at least one rigid element being configured to contact at least one of: said first elastomeric body assembly and said second elastomeric body assembly; said at least one rigid element with at least one of: said first elastomeric body assembly and said second elastomeric body assembly, being configured together as a unit to minimize shocks from said chassis to said engine to thereby minimize damage to said engine due to shocks from said chassis to said engine; and being further configured to limit the excursion of said engine with respect to said chassis upon said engine exceeding a predetermined excursion with respect to said chassis to thus minimize damage to said engine due to shocks from said chassis.

Another feature of the invention resides broadly in the skid steer loader, wherein: at least one elastomeric body assembly comprises: a first member; said first member comprising a first planar portion, a second planar portion, and a transition portion joining said first and second planar portions to form a hat-shaped structure; a passage in said second planar portion, being a central passage; a second member; said second member comprising a shaft portion and a flange portion to form a T-shaped structure; said shaft portion having a first end, disposed near said second planar portion of said first member, and a second end remote from said first end; a recessed portion disposed at the exterior of said first end of said longitudinal shaft portion to reduce the outer diameter of said first end of said longitudinal shaft portion; said flange portion being disposed at said second end of said T-shaped structure; said flange portion comprising a circular flange extending a predetermined distance from the outer diameter of said longitudinal shaft portion; said flange portion having a first surface which becomes an exterior surface upon assembly and a second surface which becomes an interior surface upon assembly, and a peripheral rim between said first and second surfaces of said flange portion; a third member; said third member comprising a body of an elastomeric material; said body of an elastomeric material, upon assembly, being disposed between said first member and said second member by being bonded to: said second surface, said peripheral rim, and the exterior of said longitudinal shaft portion of said T-shaped structure; and to the full extent of said second planar portion, the full extent of said transition portion and at least a portion of said first member; said body of an elastomeric material comprising a substantially frusto-conical structure with an outer mantle surface configured to extend from a first diameter, adjacent said flange portion of said second member, to a second diameter adjacent said first member; said body of elastomeric material further comprising: a first recess; said first recess comprising a V-shaped recess being disposed concentric to said shaft portion of said second member; a bead formation adjacent said passage in said second planar portion of said first member; and a second recess; said second recess comprising a circular recess configured and disposed to receive therein at least a portion of said at least one rigid element; one of (A.) and (B.): (A.) said second Shore A durometer value being different from said first Shore A durometer value; and (B.) said second Shore A durometer value being the same as said first Shore A durometer value; and said at least one rigid element comprises at least one disk-shaped snubber element.

Yet another feature of the invention resides broadly in a skid steer loader comprising a chassis, an engine mounted to said chassis, and apparatus to advance said loader over terrain: at least one engine mount; said at least one engine mount comprising: a first securement arrangement being configured and disposed to operably secure each said at least one engine mount to said chassis; a second securement arrangement being configured and disposed to operably secure each said at least one engine mount to said engine; a first elastomeric body assembly and a second elastomeric body assembly; said first elastomeric body assembly comprising a first elastomeric material comprising a first Shore A durometer value within a first predetermined range; said second elastomeric body assembly comprising a second elastomeric material comprising a second Shore A durometer value within a second predetermined range; said first elastomeric body assembly and said second elastomeric body assembly both being configured together as a unit to minimize vibrations from said engine to said chassis; and at least one rigid element operably connected to one of: said first securement arrangement and said second securement arrangement; said at least one rigid element being configured to contact at least one of: said first elastomeric body assembly and said second elastomeric body assembly; said at least one rigid element with at least one of: said first elastomeric body assembly and said second elastomeric body assembly, being configured together as a unit to minimize shocks from said chassis to said engine to thereby minimize damage to said engine due to shocks from said chassis to said engine; and being further configured to limit the excursion of said engine with respect to said chassis upon said engine exceeding a predetermined excursion with respect to said chassis to thus minimize damage to said engine due to shocks from said chassis.

Still another feature of the invention resides broadly in the skid steer, wherein: at least one elastomeric body assembly comprises: a first member; said first member comprising a first planar portion, a second planar portion, and a transition portion joining said first and second planar portions to form a hat-shaped structure; a passage in said second planar portion, being a central passage; a second member; said second member comprising a shaft portion and a flange portion to form a T-shaped structure; said shaft portion having a first end, disposed near said second planar portion of said first member, and a second end remote from said first end; a recessed portion disposed at the exterior of said first end of said longitudinal shaft portion to reduce the outer diameter of said first end of said longitudinal shaft portion; said flange portion being disposed at said second end of said T-shaped structure; said flange portion comprising a circular flange extending a predetermined distance from the outer diameter of said longitudinal shaft portion; said flange portion having a first surface which becomes an exterior surface upon assembly and a second surface which becomes an interior surface upon assembly, and a peripheral rim between said first and second surfaces of said flange portion; a third member; said third member comprising a body of an elastomeric material; said body of an elastomeric material, upon assembly, being disposed between said first member and said second member by being bonded to: said second surface, said peripheral rim, and the exterior of said longitudinal shaft portion of said T-shaped structure; and to the full extent of said second planar portion, the full extent of said transition portion and at least a portion of said first member; said body of an elastomeric material comprising a substantially frusto-conical structure with an outer mantle surface configured to extend from a first diameter, adjacent said flange portion of said second member, to a second diameter adjacent said first member; said body of elastomeric material further comprising: a first recess; said first recess comprising a V-shaped recess being disposed concentric to said shaft portion of said second member; a bead formation adjacent said passage in said second planar portion of said first member; and a second recess; said second recess comprising a circular recess configured and disposed to receive therein at least a portion of said at least one rigid element; one of (A) and (B.): (A.) said second Shore A durometer value being different from said first Shore A durometer value; and (B.) said second Shore A durometer value being the same as said first Shore A durometer value; and said at least one rigid element comprises at least one disk-shaped snubber element.

A further feature of the invention resides broadly in a method of making an off-road vehicle, such as a skid steer loader, a mini excavator, a front end loader, a forklift, a plow, a telehandler, construction lighting, a portable compressor, a portable pump, a portable generator, a trencher, and the like vehicle comprising a chassis, an engine, and apparatus to advance said vehicle over terrain; by using a kit; said kit comprising: a plurality of elastomeric body assemblies configured to provide an engine mount upon assembly; a first securement arrangement configured to operably secure said engine mount to said chassis; a second securement arrangement configured to operably secure said engine mount to said engine; at least one rigid element configured to be operably connected to said first securement arrangement and said second securement arrangement and configured to contact at least one of said first plurality of elastomeric bodies; said method comprising the steps of: determining the characteristics of an engine mount to minimize shocks from a chassis of a predetermined off-road vehicle to an engine of a predetermined off-road vehicle and vibrations from an engine of a predetermined off-road vehicle to a chassis of a predetermined off-road vehicle and; choosing from said plurality of elastomeric body assemblies a pair of elastic body assemblies to minimize vibrations from an engine of a predetermined off-road vehicle to a chassis of a predetermined off-road vehicle; wherein a first elastomeric body assembly is chosen with a first Shore A durometer value within a first predetermined range; and wherein a second elastomeric body assembly is chosen with a second Shore A durometer value within a second predetermined range; said pair of elastomeric body assemblies both upon assembly together with said at least one rigid member being configured together as a unit; said unit being configured to minimize damage to an engine of an off-road vehicle from shocks of a chassis of an off-road vehicle to an engine of an off-road vehicle; assembling said pair of elastomeric body assemblies to provide an engine mount; said assembling comprising disposing said at least one rigid element with said pair of elastomeric body assemblies to minimize damage to an engine of a predetermined off-road vehicle from shocks of a chassis of a predetermined off-road vehicle to an engine of a predetermined off-road vehicle; and connecting said engine mount to a chassis of a predetermined off-road vehicle and to an engine of a predetermined off-road vehicle.

Another feature of the invention resides broadly in the method, comprising one of (A.) and (B.): (A.) choosing said second Shore A durometer value and said first Shore A durometer value to be different; and (B) choosing said second Shore A durometer value and said first Shore A durometer value to be the same.

Yet another feature of the invention resides broadly in the method, comprising: selecting at least one rigid element in terms of its overall dimensions to thereby maximize protection of at least one of (i.) and (ii): (i.) an engine of an off-road vehicle against shocks from a chassis of an off-road vehicle; and (ii.) a chassis of an off-road vehicle against vibrations from an engine of an off-road vehicle.

Still another feature of the invention resides broadly in the method, wherein: said at least one rigid element comprises at least one disk-shaped snubber element.

A further feature of the invention resides broadly in the method, wherein: at least one elastomeric body assembly comprises: a first member; said first member comprising a first planar portion, a second planar portion, and a transition portion joining said first and second planar portions to form a hat-shaped structure; a passage in said second planar portion, being a central passage; a second member; said second member comprising a shaft portion and a flange portion to form a T-shaped structure; said shaft portion having a first end, disposed near said second planar portion of said first member, and a second end remote from said first end; a recessed portion disposed at the exterior of said first end of said longitudinal shaft portion to reduce the outer diameter of said first end of said longitudinal shaft portion; said flange portion being disposed at said second end of said T-shaped structure; said flange portion comprising a circular flange extending a predetermined distance from the outer diameter of said longitudinal shaft portion; said flange portion having a first surface which becomes an exterior surface upon assembly and a second surface which becomes an interior surface upon assembly, and a peripheral rim between said first and second surfaces of said flange portion; a third member; said third member comprising a body of an elastomeric material; said body of an elastomeric material, upon assembly, being disposed between said first member and said second member by being bonded to: said second surface, said peripheral rim, and the exterior of said longitudinal shaft portion of said T-shaped structure; and to the full extent of said second planar portion, the full extent of said transition portion and at least a portion of said first member; said body of an elastomeric material comprising a substantially frusto-conical structure with an outer mantle surface configured to extend from a first diameter, adjacent said flange portion of said second member, to a second diameter adjacent said first member; said body of elastomeric material further comprising: a first recess; said first recess comprising a V-shaped recess being disposed concentric to said shaft portion of said second member; a bead formation adjacent said passage in said second planar portion of said first member; and a second recess; said second recess comprising a circular recess configured and disposed to receive therein at least a portion of said at least one rigid element.

Another feature of the invention resides broadly in the method, wherein: at least one elastomeric body assembly comprises: a first member; said first member comprising a first planar portion, a second planar portion, and a transition portion joining said first and second planar portions to form a hat-shaped structure; a passage in said second planar portion, being a central passage; a second member; said second member comprising a shaft portion and a flange portion to form a T-shaped structure; said shaft portion having a first end, disposed near said second planar portion of said first member, and a second end remote from said first end; a recessed portion disposed at the exterior of said first end of said longitudinal shaft portion to reduce the outer diameter of said first end of said longitudinal shaft portion; said flange portion being disposed at said second end of said T-shaped structure; said flange portion comprising a circular flange extending a predetermined distance from the outer diameter of said longitudinal shaft portion; said flange portion having a first surface which becomes an exterior surface upon assembly and a second surface which becomes an interior surface upon assembly, and a peripheral rim between said first and second surfaces of said flange portion; a third member; said third member comprising a body of an elastomeric material; said body of an elastomeric material, upon assembly, being disposed between said first member and said second member by being bonded to: said second surface, said peripheral rim, and the exterior of said longitudinal shaft portion of said T-shaped structure; and to the full extent of said second planar portion, the full extent of said transition portion and at least a portion of said first member; said body of an elastomeric material comprising a substantially frusto-conical structure with an outer mantle surface configured to extend from a first diameter, adjacent said flange portion of said second member, to a second diameter adjacent said first member; said body of elastomeric material further comprising: a first recess; said first recess comprising a V-shaped recess being disposed concentric to said shaft portion of said second member; a bead formation adjacent said passage in said second planar portion of said first member; and a second recess; said second recess comprising a circular recess configured and disposed to receive therein at least a portion of said at least one rigid element; one of (A.) and (B.): (A.) said second Shore A durometer value being selected to be different from said first Shore A durometer value; and (B.) said second Shore A durometer value being selected to be the same as said first Shore A durometer value; and said at least one rigid element comprising at least one disk-shaped snubber element.

Yet another feature of the invention resides broadly in an off-road vehicle engine mount for an off-road vehicle, such as a skid steer loader, a mini excavator, a front end loader, a forklift, a plow, a telehandler, construction lighting, a portable compressor, a portable pump, a portable generator, a trencher, and the like vehicle, configured to minimize shocks from a chassis to an engine and vibrations from an engine to a chassis; said engine mount comprising: a first securement arrangement being configured to operably secure said engine mount to a chassis of a predetermined off-road vehicle; a second securement arrangement being configured to operably secure said engine mount to an engine of a predetermined off-road vehicle; a first elastomeric body assembly and a second elastomeric body assembly; said first elastomeric body assembly comprising a first elastomeric material comprising a first Shore A durometer value within a first predetermined range; said second elastomeric body assembly comprising a second elastomeric material comprising a second Shore A durometer value within a second predetermined range; said first elastomeric body assembly and said second elastomeric body assembly both being configured together as a unit to minimize vibrations from an engine of a predetermined off-road vehicle to a chassis of a predetermined off-road vehicle; and at least one rigid element operably connected to one of: said first securement arrangement and said second securement arrangement; said at least one rigid element being configured to contact at least one of: said first elastomeric body assembly and said second elastomeric body assembly; said at least one rigid element with at least one of: said first elastomeric body assembly and said second elastomeric body assembly, being configured together as a unit to limit the excursion of an engine of a predetermined off-road vehicle with respect to a chassis of a predetermined off-road vehicle upon an engine of a predetermined off-road vehicle exceeding a predetermined excursion with respect to a chassis of a predetermined off-road vehicle to thus minimize damage to an engine of a predetermined off-road vehicle due to shocks from a chassis of a predetermined off-road vehicle; and being configured together as a unit to minimize shocks from a chassis of predetermined off-road vehicle to an engine of a predetermined off-road vehicle to thereby minimize damage to an engine of a predetermined off-road vehicle due to shocks from a chassis of a predetermined off-road vehicle to an engine of a predetermined off-road vehicle.

Still another feature of the invention resides broadly in the off-road vehicle engine mount, wherein: said first Shore A durometer value and said second Shore A durometer value are different.

A further feature of the invention resides broadly in the off-road vehicle engine mount, wherein: said first Shore A durometer value and said second Shore A durometer value are the same.

Another feature of the invention resides broadly in the off-road vehicle engine mount, wherein: said at least one rigid element comprises at least one disk-shaped snubber element.

Yet another feature of the invention resides broadly in the off-road vehicle engine mount, wherein: at least said first elastomeric body assembly comprises: a first member; said first member comprising a first planar portion, a second planar portion; and a transition portion joining said first and second planar portions to form a hat-shaped structure; and a passage in said second planar portion, being a central passage.

Still another feature of the invention resides broadly in the off-road vehicle engine mount, wherein: at least said first elastomeric body assembly comprises: a second member; said second member comprising a shaft portion and a flange portion to form a T-shaped structure; said shaft portion having a first end, disposed near said second planar portion of said first member, and a second end remote from said first end; a recessed portion disposed at the exterior of said first end of said longitudinal shaft portion to reduce the outer diameter of said first end of said longitudinal shaft portion; said flange portion being disposed at said second end of said T-shaped structure; said flange portion comprising a circular flange extending a predetermined distance from the outer diameter of said longitudinal shaft portion; and said flange portion having a first surface which becomes an exterior surface upon assembly and a second surface which becomes an interior surface upon assembly, and a peripheral rim between said first and second surfaces of said flange portion.

A further feature of the invention resides broadly in the off-road vehicle engine mount, wherein: at least said first elastomeric body assembly comprises: a third member; said third member comprising a body of an elastomeric material; said body of an elastomeric material, upon assembly, being disposed between said first member and said second member by being bonded to: said second surface, said peripheral rim, and the exterior of said longitudinal shaft portion of said T-shaped structure; and to the full extent of said second planar portion, the full extent of said transition portion and at least a portion of said first member; said body of an elastomeric material comprising a substantially frusto-conical structure with an outer mantle surface configured to extend from a first diameter, adjacent said flange portion of said second member, to a second diameter adjacent said first member; said body of elastomeric material further comprising: a first recess; said first recess comprising a V-shaped recess being disposed concentric to said shaft portion of said second member; a bead formation adjacent said passage in said second planar portion of said first member; and a second recess; said second recess comprising a circular recess configured and disposed to receive therein at least a portion of said at least one rigid element.

Another feature of the invention resides broadly in the off-road vehicle engine mount, wherein: said engine mount is secured by threaded fasteners to an engine and a chassis.

Yet another feature of the invention resides broadly in the off-road vehicle engine mount, wherein: said at least one rigid element comprises a pair of cylindrical, disk-shaped snubber elements.

Still another feature of the invention resides broadly in the off-road vehicle engine mount, wherein: at least one elastomeric body assembly comprises: a first member; said first member comprising a first planar portion, a second planar portion, and a transition portion joining said first and second planar portions to form a hat-shaped structure; a passage in said second planar portion, being a central passage; a second member; said second member comprising a shaft portion and a flange portion to form a T-shaped structure; said shaft portion having a first end, disposed near said second planar portion of said first member, and a second end remote from said first end; a recessed portion disposed at the exterior of said first end of said longitudinal shaft portion to reduce the outer diameter of said first end of said longitudinal shaft portion; said flange portion being disposed at said second end of said T-shaped structure; said flange portion comprising a circular flange extending a predetermined distance from the outer diameter of said longitudinal shaft portion; said flange portion having a first surface which becomes an exterior surface upon assembly and a second surface which becomes an interior surface upon assembly, and a peripheral rim between said first and second surfaces of said flange portion; a third member; said third member comprising a body of an elastomeric material; said body of an elastomeric material, upon assembly, being disposed between said first member and said second member by being bonded to: said second surface, said peripheral rim, and the exterior of said longitudinal shaft portion of said T-shaped structure; and to the full extent of said second planar portion, the full extent of said transition portion and at least a portion of said first member; said body of an elastomeric material comprising a substantially frusto-conical structure with an outer mantle surface configured to extend from a first diameter, adjacent said flange portion of said second member, to a second diameter adjacent said first member; said body of elastomeric material further comprising: a first recess; said first recess comprising a V-shaped recess being disposed concentric to said shaft portion of said second member; a bead formation adjacent said passage in said second planar portion of said first member; and a second recess; said second recess comprising a circular recess configured and disposed to receive therein at least a portion of said at least one rigid element; one of (A.) and (B.): (A.) said second Shore A durometer value being different from said first Shore A durometer value; and (B.) said second Shore A durometer value being the same as said first Shore A durometer value; and said at least one rigid element comprises at least one disk-shaped snubber element.

Our invention comprises the following characteristics:
(a) the internal snubber which limits the overall isolator deflections—thereby protecting the isolated unit from excessive motion damage and protecting the working elastomer section from being overloaded and over stressed. The overall deflections can be changed to any desired amount by changing the size and shape of the snubbing washer. With this system axial and radial snubbing can be substantially controlled independently of one another; and
(b) the tunable sections of the isolator; thus, the same manufacturing tool can produce elements halves made of varying stiffness elastomers and the completed design assembly can combine two different stiffness elements to make the optimal stiffness final product or assembly.

The embodiments of the isolator in accordance with our invention serve to control excessive motions of the isolated unit while providing a high degree of isolation to the unit. In severe applications where high loads are transferred to the isolated unit, i.e., as experienced in off-highway or off-road applications, our invention will limit the overall motion of the unit and protect the working section of the isolator from being overstressed or over stressed. This is accomplished by the internal snubbing system which can be preset to known displacements without affecting isolator stiffness. By having two separate tunable systems, a very soft and efficient isolator can be used without having excessive motion problems which normally occur when soft systems and high loads are combined.

In general, two geometrically identical halves of elastomeric body assemblies are fastened together with an internal snubbing washer. The working section of the isolator consists of the two halves using elastomer as their spring to provide the desired stiffness for isolation. The snubbing system is a washer that is free to move a predetermined amount in the pocket created by attaching the two halves together. The isolator can have varying stiffness and snubbing deflections based on desired results.

The above-discussed embodiments of the present invention will be described further hereinbelow. When the word "invention" is used in this specification, the word "invention" includes "inventions", that is the plural of "invention". By stating "invention", the Applicants do not in any way admit that the present application does not include more than one patentably and non-obviously distinct invention, and maintain that this application may include more than one patentably and non-obviously distinct invention. The Applicants hereby assert that the disclosure of this application may include more than one invention, and, in the event that the is more than one invention, that these inventions may be patentable and non-obvious one with respect to the other.

BRIEF DESCRIPTION OF THE DRAWINGS

The invention is explained in greater detail below with reference to the embodiments which are illustrated in the accompanying drawings.

DESCRIPTION OF THE PREFERRED EMBODIMENTS

Figure 1:
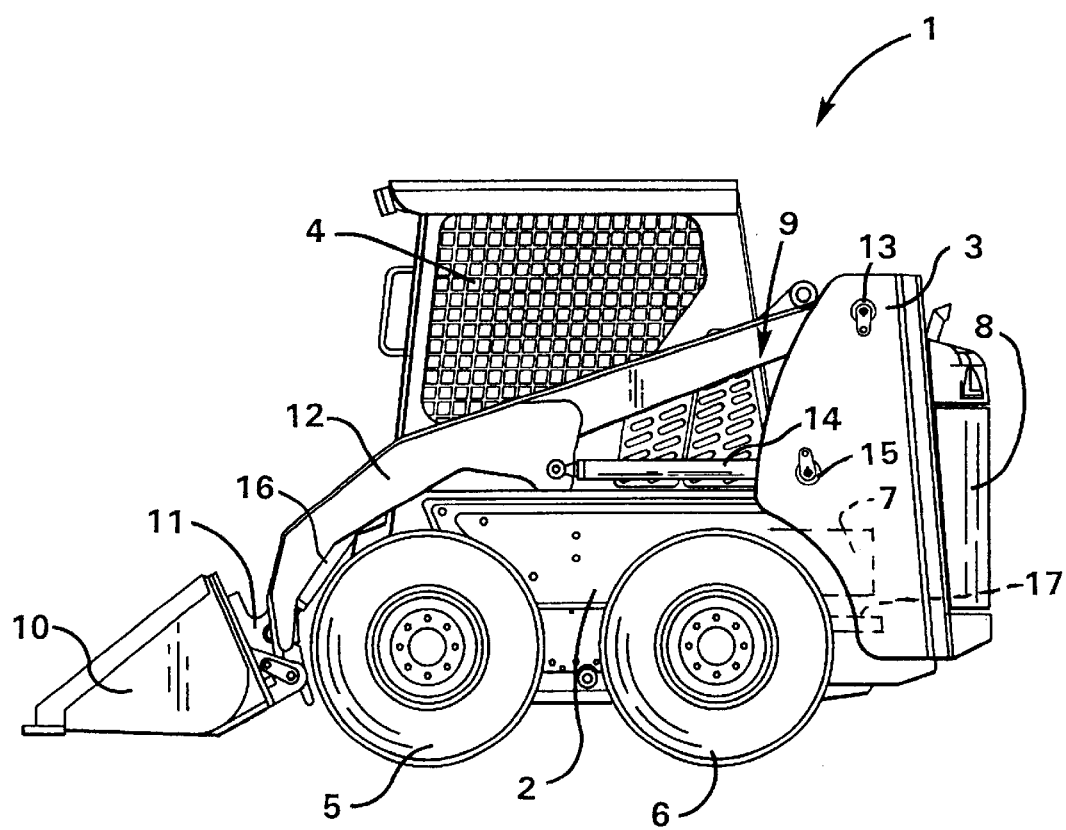
FIG. 1: is a side elevation of a skid steer loader embodying the present invention.

FIG. 1 illustrates a skid steer loader that has at least one or a pair of implement lift arm assemblies pivotally connected with a body of the loader. The lift arms, their associated lift actuators, and the connections between the various components of the lift arm assemblies and the machine implement are configured to provide increased dump reach without negatively impacting structural life, to increase machine productivity by reduced cycle times, and to improve visibility of the implement from the operator's station.

FIG. 1 is a copy of FIG. 1 from U.S. Pat. No. 6,109,858 issued to Deneve et al. on Aug. 29, 2000, from which figure copy all of the reference numerals present in the original figure, as it appears in U.S. Pat. No. 6,109,858, have been removed. U.S. Pat. No. 6,109,858 is hereby incorporated by reference as if set forth in its entirety herein. The reference numerals that have been removed from the FIG. 1 for this U.S. Pat. No. 6,109,858, essentially reproduced herein as FIG. 1, indicate arrangements that are well known in the prior art.

With reference to the drawing, in FIG. 1 a skid steer loader is generally designated 1, and comprises a body 2 which includes a chassis and having left and right upright stanchions or tower portions such as 3 that can be seen, and an operator's station, generally designated 4. Front and rear pairs of coaxial drive wheels 5, 6 are mounted to the body 2 and powered by an engine 7 which is mounted to the body 2 rearward of the operator's station 4 in a rear engine enclosure 8. The distance between the centers of front and rear wheels 5, 6 on each side of the loader 1 define a wheel base. The drive wheels 5, 6 may be driven in a conventional, skid-steer fashion which is well known in the art. However, one skilled in the art will recognize that the drive wheels 5, 6 may be replaced by left and right endless belts or track assemblies (not shown) or may be used to simulate belts or tracks (not shown) by driving rubber belts or steel tracks looped there around.

Left and right interconnected lift arm assemblies—of which one, designated 9, can be seen—are mounted to the body 2 and have an implement assembly, such as a bucket 10, pivotally mounted at the forward ends thereof. In the illustrated loader 1, the implement assembly includes a coupler assembly 11 to which the bucket 10 or other implement is attached, and the coupler assembly 11 itself is pivotally connected with the lift arm assemblies (9) The lift arm assemblies (9) may be substantially identical to each other on either side of the body 2 of the skid steer loader 1. The lift arm assembly 9 comprises a lift arm 12 pivotally connected with the right tower portion 3 of the body 2 at a lift arm pivot point 13, which is spaced a fixed distance rearward of the center of the front drive wheel 5. The lift arm assembly 9 can be pivoted about lift arm pivot point 13, due to the action of a lift arm actuator 14, such as a piston-cylinder unit, which is pivotable about pivot point 15 The bucket 10 can be actuated by a tilt actuator 16, such as a piston-cylinder unit.

The engine 7 can possibly be supported at the chassis or body 2 by a plurality of shocks and vibrations isolators, or engine mounts, of which one is shown schematically and generally identified by reference numeral 17. The shocks and vibrations isolators, or engine mounts, are configured of the type as will be described further below.

The skid steer concept was introduced by Bobcat in 1960, in response to demands for a loader that would be able to manoeuver effectively in confined spaces. The method of steering and propulsion is conceptually similar to that of a tracked vehicle—the two wheels on the same side move in unison, with each pair on opposite sides capable of being driven independently. If both pairs are driven forward with the same speed, then the loader moves forward, but if they are driven in opposite directions, the loader will turn on itself. This flexibility allows incredibly compact maneuvers to be effected, and skid steer loaders are now found in a wide variety of applications including construction, agriculture and industry. The clever aspect of the concept lies in the distribution of weight in the vehicle. When unladen, the center of gravity lies towards the rear of the vehicle near the engine, which makes the center of steering occur right in the middle of the rear axle, with the front wheels skidding around this. If the loader has significant weight in the bucket, the center of gravity moves to the front of the vehicle making the rear wheels skid around the front axle. While useful in this regard, the offset distribution of weight can sometimes lead to instability, particularly when traveling up and down inclines and suddenly changing direction from reverse to forward. Counterweights are sometimes employed to help reduce this effect.

Thus, a skid steer vehicle is turned by a differential rotation of the right and left driving wheels thereof.

Figure 2:
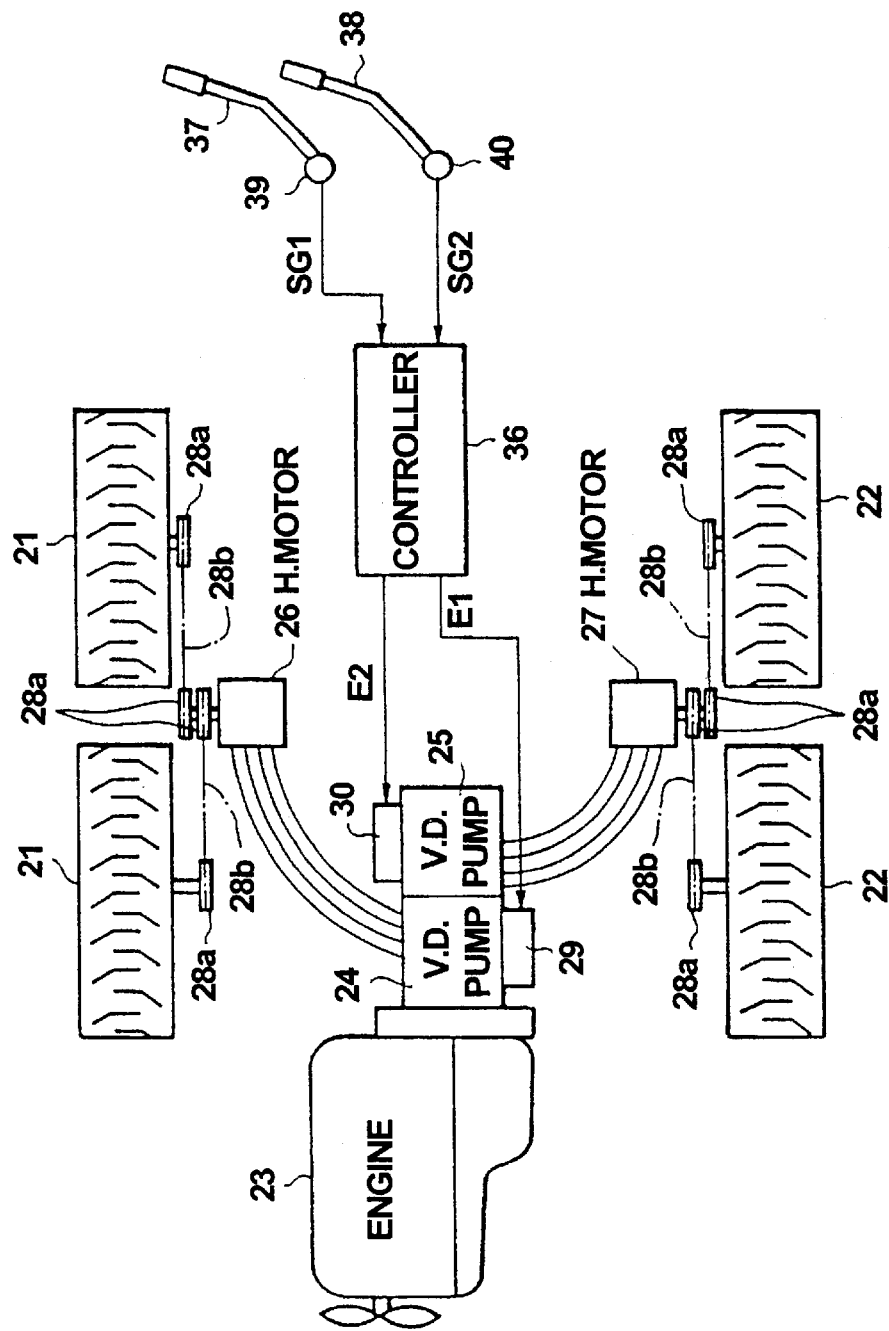
FIG. 2: is a diagrammatic illustration of the driving system of a skid steer loader.

Referring to FIG. 2 showing the driving system of a wheeled skid steer loader or vehicle, first and second driving units respectively for driving first driving wheels 21 and second driving wheels 22 comprise first and second variable displacement pumps 24 and 25 which are driven by an engine 23 serving as a prime mover, and first and second hydraulic motors 26 and 27 operatively connected to the first driving wheels 21 and to the second driving wheels 22, respectively. The variable displacement pumps 24 and 25 supply hydraulic fluid to the hydraulic motors 26 and 27, respectively, to drive the hydraulic motors 26 and 27. The respective rotative forces of the hydraulic motors 26 and 27 are transmitted through sprockets 28a and chains 28b to the driving wheels 21 and the driving wheels 22, respectively. In this embodiment, the variable displacement pumps 24 and 25 may possibly be swash plate type hydraulic pumps, and the respective tilt angles of the swash plates of the variable displacement pumps 24 and 25 are regulated by swash plate actuators 29 and 30 provided on the variable displacement pumps 24 and 25 to control the direction and rotating speed of the output shafts of the first hydraulic motor 26 and the second hydraulic motor 27, respectively. Although the embodiment employs the engine 23 as the prime mover, the prime mover is not limited thereto, and may be any prime mover suitable for operating the driving units, such as an internal-combustion engine, an external-combustion engine or an electric motor. The variable displacement pumps 24 and 25 may be of a bent axis type or of any other appropriate type.

As further shown in FIG. 2, a first manual control lever 37 and a second manual control lever 38 provided in the operator's compartment are associated with a first left control amount detector 39 and a second control amount detector 40, namely, potentiometers in this embodiment, respectively, which provides control amount signals SG1 and SG2 proportional to the respective control amounts of the manual control levers 37 and 38, respectively to a controller 36. The controller 36 applies signals E1 and E2 to the swash plate actuators 29 and 30. The control amount detectors 39 and 40 are not limited to potentiometers; for example, the control amount detectors 39 and 40 may be inductance-type detectors or capacitance-type detectors.

FIG. 2 is a copy of FIG. 1 from U.S. Pat. No. 4,837,694 issued to Narita et al. on Jun. 6, 1989, from which figure copy all of the reference numerals present in the original figure, as it appears in U.S. Pat. No. 4,837,694, have been removed. U.S. Pat. No. 4,837,694 is hereby incorporated by reference as if set forth in its entirety herein. The reference numerals that have been removed from the FIG. 1 for this U.S. Pat. No. 4,837,694, essentially reproduced herein as FIG. 2, indicate arrangements that are well known in the prior art.

Figure 3:
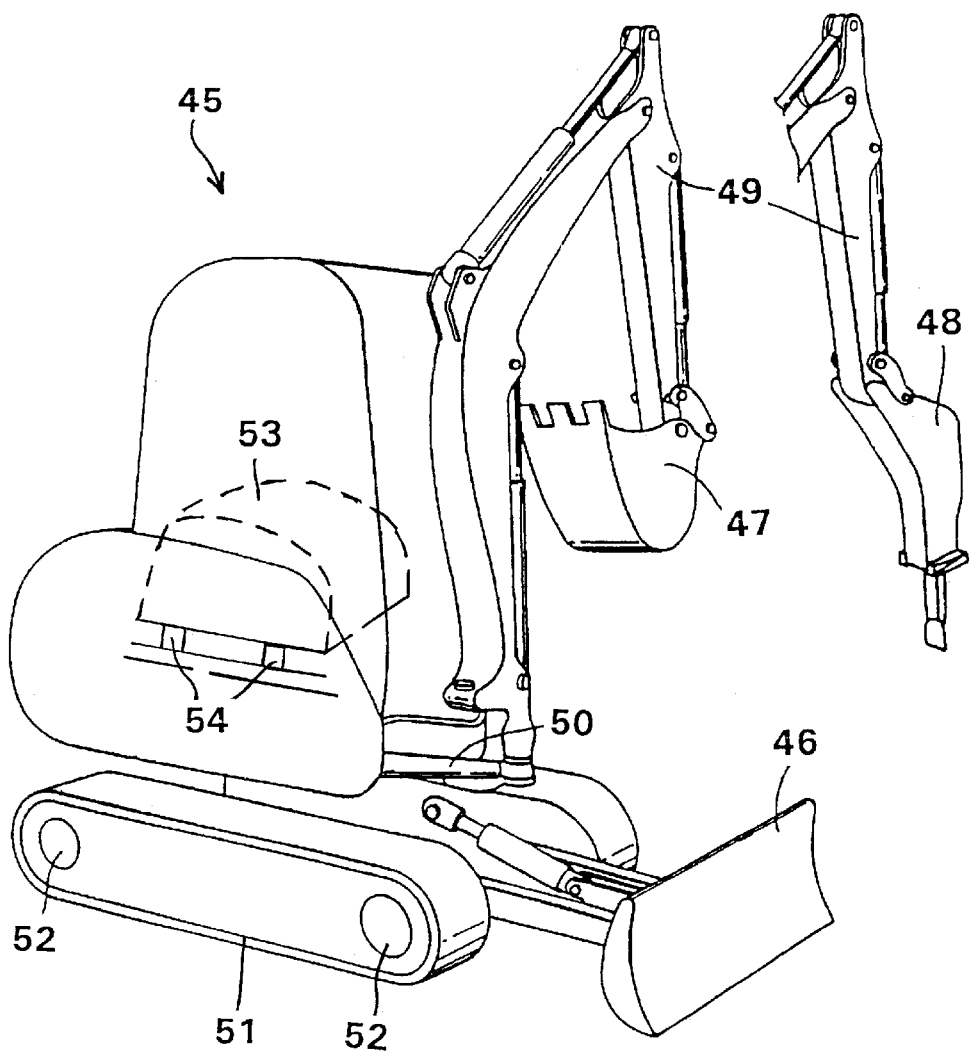
FIG. 3: is a perspective view of a mini excavator or like vehicle embodying the present invention.

FIG. 3 illustrates a mini excavator 45 having a forwardly disposed dozer blade arrangement 46 and, selectively, a bucket 47 or a hammer 48 which are supported on a boom arm 49. Boom arm 49 can be swung by way of a swing arrangement 50. The mini excavator 45 can possibly comprise revolving tracks 51 driven by track drive motor arrangements, generally identified by reference numeral 32.

An engine 53 can possibly be supported or mounted by a plurality of engine mounts, or shocks and vibrations isolators, schematically illustrated and generally identified by reference numeral 34, which engine mounts 54 are connected to the engine 53 and the chassis forming part of the mini excavator 45.

The shocks and vibrations isolators, or engine mounts, 54 can possibly be configured of the type as will be described in detail further below.

FIG. 3 is a copy of FIG. 1 from U.S. Pat. No. 5,832,729 issued to Reid et al. on Nov. 10, 1998, from which figure copy all of the reference numerals present in the original figure, as it appears in U.S. Pat. No. 5,832,729, have been removed. U.S. Pat. No. 5,832,729 is hereby incorporated by reference as if set forth in its entirety herein. The reference numerals that have been removed from the FIG. 1 for this U.S. Pat. No. 5,832,729, essentially reproduced herein as FIG. 3, indicate arrangements that are well known in the prior art.

Figure 4:
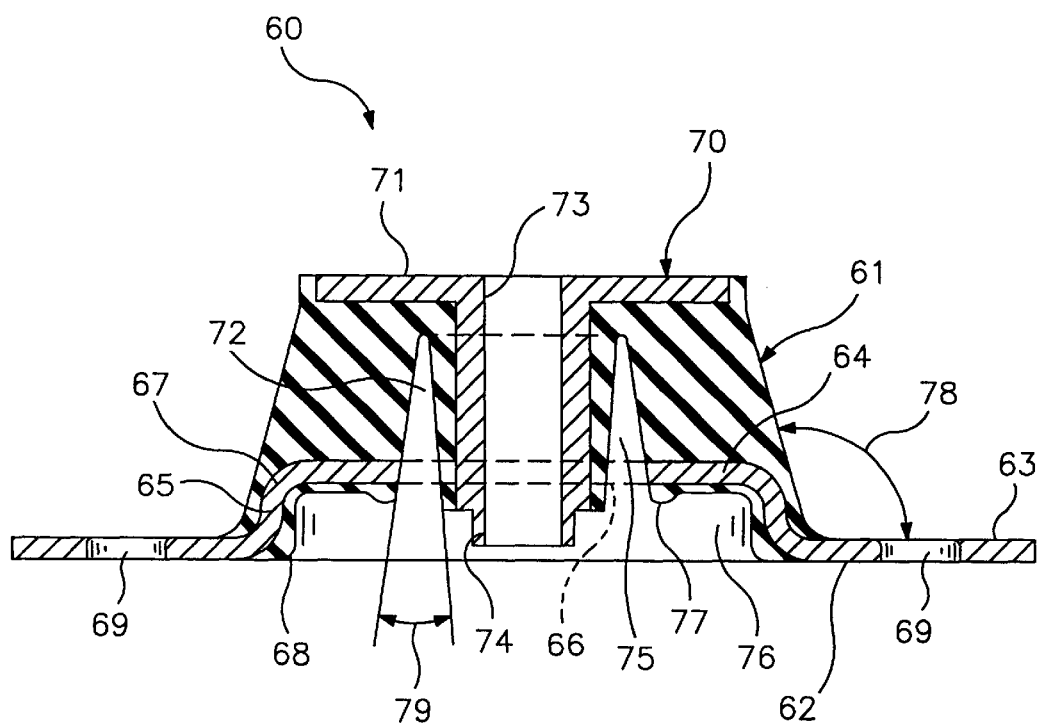
FIG. 4: is a cross-section of an elastomeric body assembly.

FIG. 4 shows a cross-section of an elastomeric body assembly generally identified by reference numeral 60, which elastomeric body assembly 60 in assembly with a second elastomeric body assembly becomes a first component of an engine mount as will be described further below.

With reference to FIG. 4, the elastomeric body assembly 60 shown therein comprises an elastomeric body 61. Elastomeric body 61 is generally disposed with its lower end at a member 62 forming a base.

Member 62 comprises a first planar portion 63, a second planar portion 64 extending substantially parallel with respect to base member 62, and a cylindrical transition portion 65, all these three portions forming a hat-shaped structure with a central passage 66 being provided in the second planar portion 64.

An upper rounded transition 67 joins the second planar portion 64 and the cylindrical transition portion 65 while a lower rounded transition 68 joins the cylindrical transition portion 65 and the first planar portion 63.

To accommodate fasteners, such as bolts, the first planar portion 63 comprises holes or passages 69.

The elastomeric body assembly 60 further comprises a T-shaped bushing 70.

Thus, T-shaped bushing 70 has a disk-shaped flange portion 71 at its one end and a central shaft portion 72.

A longitudinal central bore 73 is disposed in central shaft portion 72 to receive therein a bolt or the like fastener to be described further below. The outer diameter of the central shaft portion 72 is reduced in diameter at the end of the shaft portion 72 that is opposite to the end that comprises the disk-shaped flange portion 71, to thereby form a recessed portion 74.

The material of the base member 62 and the T-shaped bushing 70 may be steel or other suitable material.

Elastomeric body 61 is generally disposed between the T-shaped bushing 70 and the base 62 and is bonded to the T-shaped bushing 70 and the base 62.

It will be seen in FIG. 4 that the elastomeric body 61 is bonded to the inner face and about the rim of the disk-shaped flange portion 71 of the T-shaped bushing 70, and bonded to the outer diameter of the longitudinal central shaft portion 72 down to the recessed portion 74.

The elastomeric body 61 is a substantially frusto-conical structure, the upper end of which surrounds the peripheral rim of the disk-shaped flange portion 71 by a suitable diameter. The outer surface of the elastomeric body 61 then slopes by an angle 78 down to the upper surface of the first planar portion 63 with a suitable transition radius.

Interiorly, the elastomeric body 61 comprises a V-shaped recess 75 with the apex being disposed towards the disk-shaped flange portion 71. The V-shaped recess has an angle 79.

The elastomeric body 61 also comprises a cylindrical recess 76 disposed adjacent to the generally hat-shaped base 62. The elastomeric body 61 furthermore comprises a bead formation 77.

The passage 66 is provided centrally in the second planar portion 64 to receive therethrough a portion of the elastomeric body 61 and the lower end of the central shaft portion 72 of T-shaped bushing 70. Thus, the central passage 66 in second planar portion 64 will have a corresponding diameter.

Figure 5:
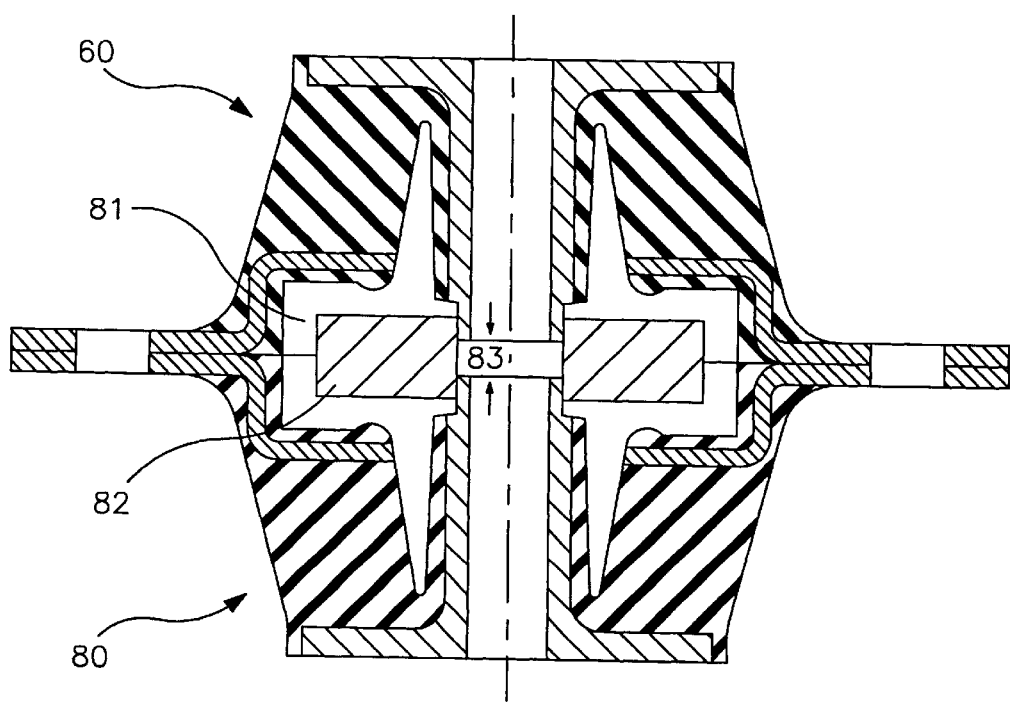
FIG. 5: is a cross-section of an engine mount in the preinstalled condition.

As seen with reference to FIG. 5, two elastomeric body assemblies are provided in face-to-face position. The upper assembly comprises a first elastomeric body assembly in accordance with the elastomeric 60 of FIG. 4. The first elastomeric body assembly so may comprise a first Shore A durometer value while the second elastomeric body assembly, generally identified by reference numeral 80 may comprise a second Shore A durometer value, as is suggested by the difference in cross hatching.

The two elastomeric body assemblies 60 and 80 define a cavity 81 for a disk-shaped element 82 which serves as a snubber or snubbing element.

Disk-shaped element 82 has an inner diameter that matches the outer diameter of the recessed portions of the T-shaped bushing of each elastomeric body assembly 60 and 80, refer to FIG. 4.

As illustrated in FIG. 5, the ends of the central shaft portions of the T-shaped bushing, such as 72 of FIG. 4, extend partially into the disk-shaped element 82 leaving a gap 83.

Molding of an elastomeric body assembly such as 60 may possibly be done by positioning the T-shaped bushing 70 in a mold and then molding about it the elastomeric body 61 by way of mold components and insertion of the base member 62 at a suitable point in time of molding.

In one possible embodiment, the three components, comprising the member 62, the elastomeric body 61 and the T-shaped bushing 70 may be joined by an adhesive.

Figure 6:
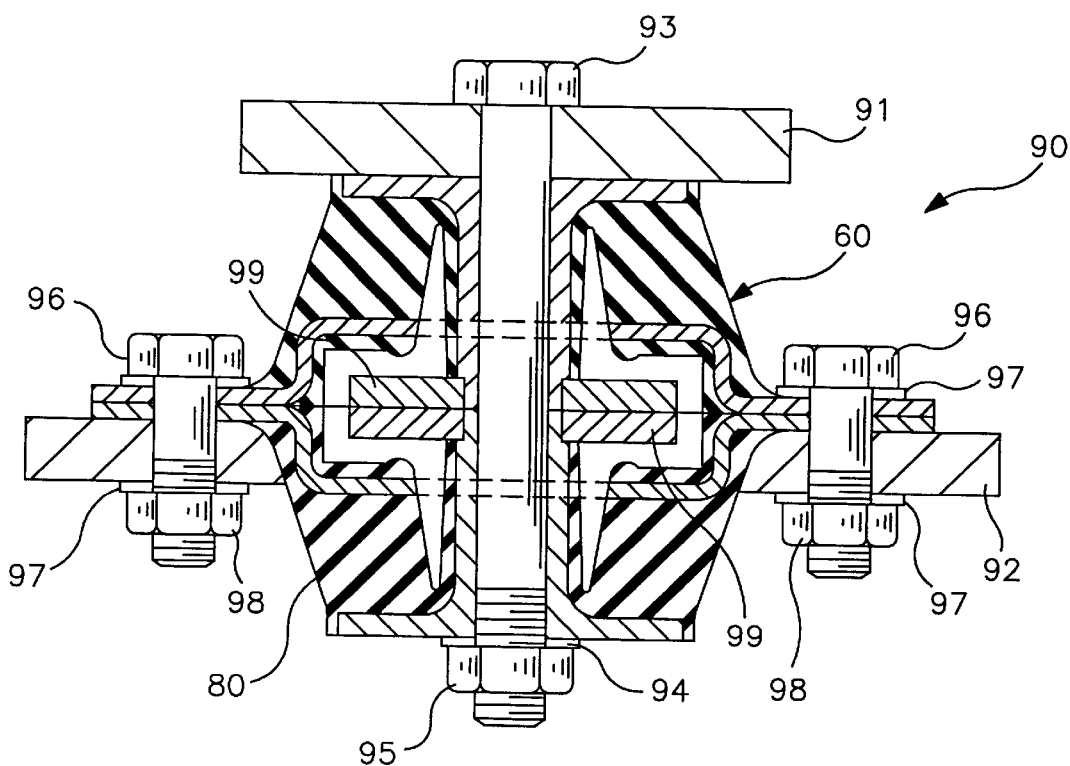
FIG. 6: is a cross-section of an engine mount in the installed condition.

FIG. 6 shows in greater detail an engine mount 90 secured to a chassis portion 91 and an engine portion 92.

The engine mount 90 comprises a first elastomeric body assembly such as 60 and a second elastomeric body assembly such as 80.

The engine mount 90 is secured to chassis portion 91 by way of a longitudinal bolt 93, a washers 94, and a nut 95.

The engine mount 90 is further secured to the engine portion 92 by means of bolts 96, washers 97, and nuts 98. The described securement by way of bolts, washers, and nuts, is merely by way of example. Other fastening arrangements are within the scope of the present invention.

The first elastomeric body assembly 60 and the second elastomeric body assembly 80 are configured in like manner and each comprise an elastomeric body such as 61, a T-shaped bushing such as 70 and a base such as 62, as described in greater detail with reference to FIG. 4. The interface of the first 60 and second 80 structures includes a pair of rigid disk-shaped members, generally identified by reference numeral 99 which also serve as snubbing elements.

In this illustration, the engine mount 90 is positioned such that the recessed portions, such as 74 in FIG. 4, of each T-shaped bushing 70, are in abutment with each other.

Figure 7:
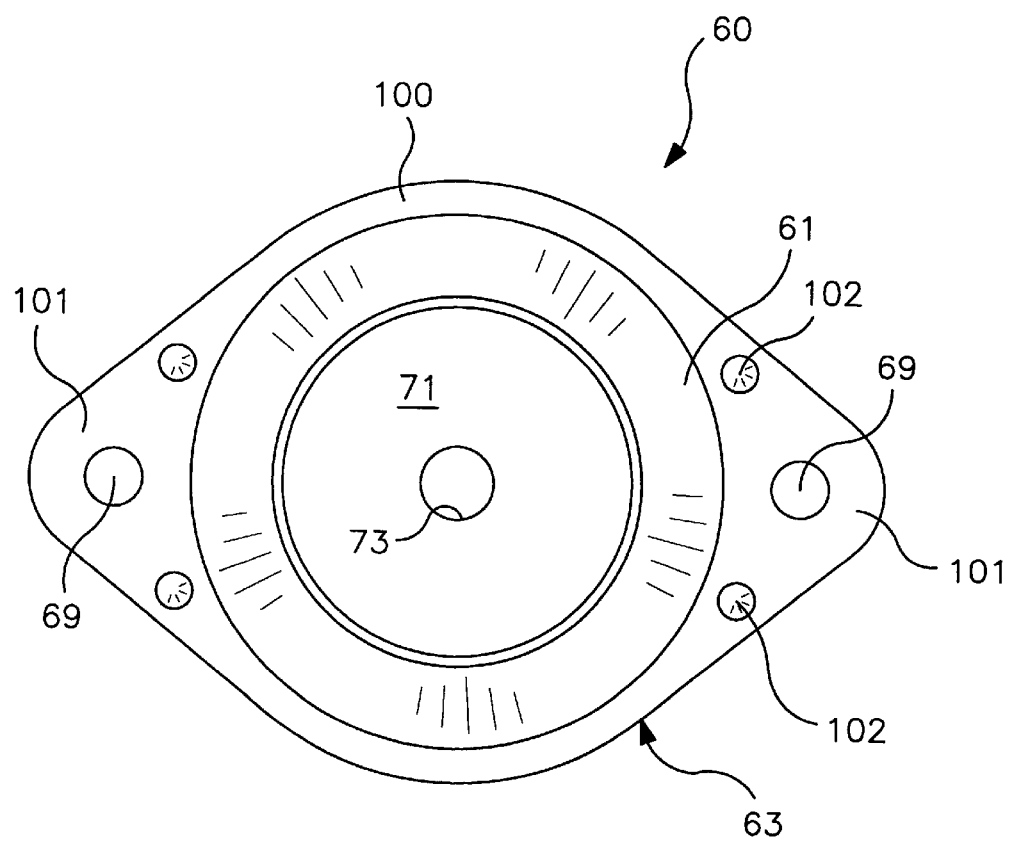
FIG. 7: is a top plan view of the elastomeric body assembly in accordance with FIG. 4.

As illustrated in FIG. 7, the first planar portion 63 includes a circular land portion 100 and adjoining fastening portion 101. Rivets, such as, countersunk rivets, generally identified by reference numeral 102, may be used to join the two elastomeric body assemblies.

Dimensional details may be given as follows:

The member 62 possibly comprises a width of approximately 150 millimeters and a thickness of approximately 3 millimeters, with the second planar portion 64 extending substantially parallel with respect to base member 62 at a distance of approximately 13 millimeters, and the cylindrical transition portion 65 having an inside diameter of approximately 74 millimeters.

The upper rounded transition 67 possibly joins the second planar portion 64 and the cylindrical transition portion 65 with a possible outside radius of approximately 3 millimeters, and the lower rounded transition 68 joins the cylindrical transition portion 65 and the first planar portion 63 with a possible similar inside radius.

The holes or passages 69 may have a diameter of approximately 10 millimeters and may be spaced at approximately 120 millimeters.

The disk-shaped flange portion 71 of T-shaped bushing 70 possibly has a diameter of approximately 67 millimeters and the rim may possibly have a thickness of approximately 5 millimeters. The diameter of the shaft portion 72 may possibly comprise approximately 22 millimeters. The length of the T-shaped bushing possibly amounts to approximately 44 millimeters. Furthermore, the longitudinal central bore 73 may possibly have a diameter of approximately 13 millimeters. The outer diameter of the recessed portion 74 may possibly comprise approximately 18 millimeters and its length may possibly amount to approximately 6 millimeters.

The elastomeric body 61 is a substantially frusto-conical structure, the upper end of which surrounds the peripheral rim of the disk-shaped flange portion 71 by a diameter of approximately 68 millimeters. The outer surface of the elastomeric body 61 then slopes by an angle of approximately 80 degrees down to the upper surface of the first planar portion 63 with a transition radius of approximately 7 millimeters.

Interiorly, the elastomeric body 61 comprises a V-shaped recess 75 with the V-shaped recess having an angle of approximately 14 degrees and one side extending substantially parallel to the slope of the-mantle of elastomeric body 61.

The elastomeric body 61 also comprises a cylindrical recess 76 possibly having an inner diameter of approximately 74 millimeters and a depth of approximately 10 millimeters.

The elastomeric body 61 furthermore comprises a bead formation 77 possibly having a radius of approximately 2 millimeters.

The height of two elastomeric body assemblies joined as an engine unit may possibly comprise approximately 93 millimeters.

Disk-shaped element 82 may possibly have an inner diameter of approximately 18 millimeters that matches, with suitable tolerances, the outer diameter of the recessed portions of the T-shaped bushing of each elastomeric body assembly 60 and 80, refer to FIG. 4. The thickness of a single disk-shaped element 82 as shown in FIG. 5 may possibly comprise 13 millimeter and its outside diameter may possibly comprise approximately 60 millimeters, or more or less.

As illustrated in FIG. 5, the ends of the central shaft portions of the T-shaped bushing, such as 72 of FIG. 4, extend partially into the disk-shaped element 82 leaving a gap of about 5 millimeters.

Figure 8:
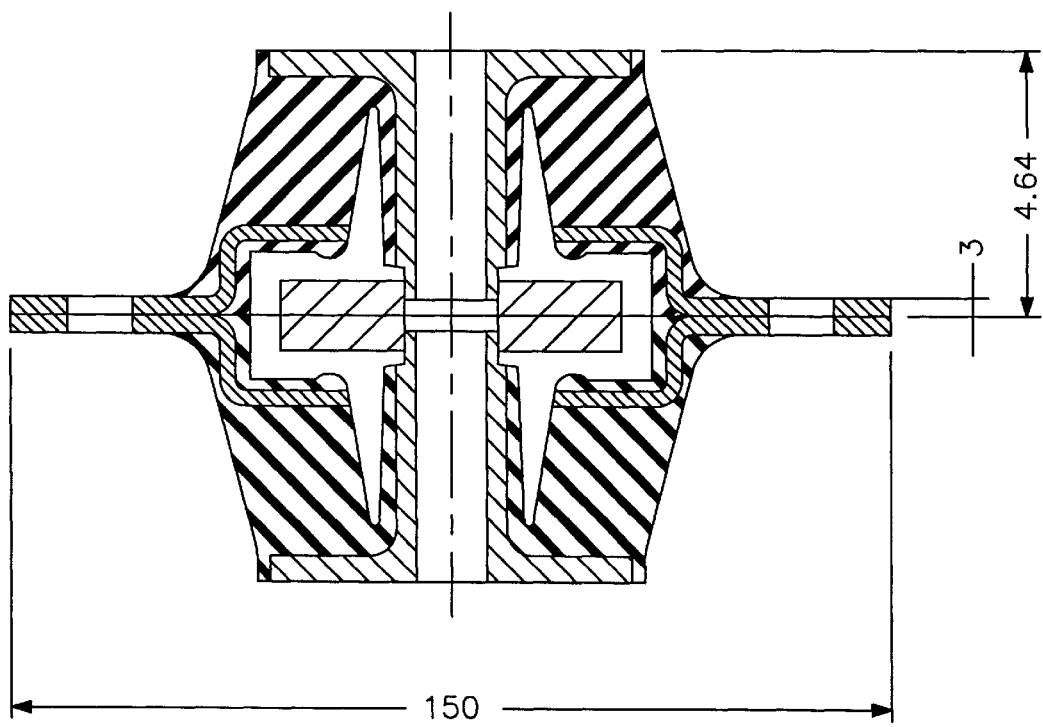
FIG. 8: is a view similar to FIG. 5.

With reference to FIG. 8, the overall width of a pair of elastomeric bodies amounts to approximately 150 millimeters and the height of the assembly amounts to about 93 millimeters.

Figure 9:
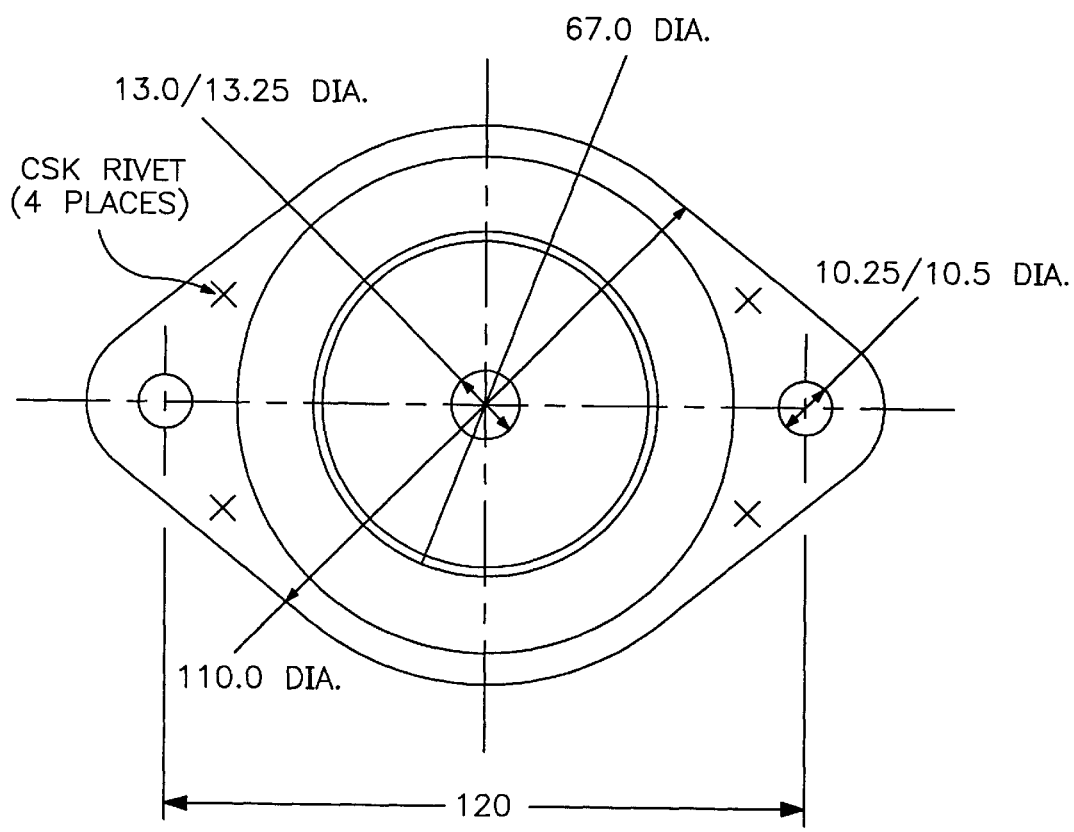
FIG. 9: is a view similar to FIG. 7.

FIG. 9 illustrates that the circular land portion, identified by reference numeral 100 in FIG. 7, possibly comprises a diameter of approximately 110 millimeters.

It will be appreciated that the vibrations from an engine to a chassis will be minimized due to the selected Shore A durometer value or values for each of a pair of elastomeric body assemblies comprising a elastomeric body, such as 61 in FIG. 4, which value or values, possibly along with other characteristics, such as, hysteresis or energy absorption, will be chosen, such as, by experimentation, to provide anti-resonance to minimize vibrations from an engine to a chassis. Thus, an engine mount comprising same or different Shore A durometer values in the elastomeric bodies, such as 61 in FIG. 4, may be used to minimize vibrations.

It will be appreciated that the values of dimensions, such as, for magnitude of distance, diameters, and radii, in the foregoing are merely by way of example.

Thus, the dimensions indicated may vary and may comprise suitable tolerances and variations, either decreasing or increasing the values given as examples.

For example, the diameter for the single disk-shaped element 82 of FIG. 5 may comprise a range of from about 60 millimeters to about 65 millimeters, more or less, and the thickness may comprises a range of from about 12.5 millimeters to about 13.5 millimeters, or more or less.

It is preferred that the clearance about the disk-shaped element 82, in the installed condition as illustrated in FIG. 6, is approximately 5 millimeters about the diameter and approximately 5 millimeters above and below in the cavity indicated by reference numeral 81 in FIG. 5. However, this clearance may conceivably be approximately in the range of from approximately 4 millimeters to approximately 3 millimeters, or less, in some possible embodiments of the present invention.

Thus, with respect to ranges mentioned, Applicants contemplate that every increment between the endpoints of ranges disclosed herein, such as, for example, length of distance, length of radius, length of diameter is encompassed herein as if it were specifically stated.

For example, with respect to a range of from approximately 12.5 millimeters to approximately 13.5 millimeters, this is to be understood to include, within the range of millimeters, steps of millimeters, or steps of one tenth of a millimeter, or smaller or greater, such that any one tenth of a millimeter may be a limit of a diminished range, that is, the range encompasses about one tenth of a millimeter increments, thereby specifically including about 12.6 millimeters, about 12.7 millimeters, about 12.8 millimeters, about 12.9 millimeters, about 13.0 millimeters, about 13.1 millimeters, about 13.2 millimeter, about 13.3 millimeters, and about 13.4 millimeters.

In summary, the off-highway, or off-road, equipment engine mount for extreme service conditions of our invention comprises a shocks and vibrations isolator that is configured to meet the needs of off-road equipment, and comprises an all-inclusive design that has variable spring rates or springrates, rebound control, and overload protection. The inventive assembly provides a single, unitary part that has no loose components, is simple in installation and that will fit metric applications and other applications or units. The inventive shocks and vibrations isolator comprises a low-cost design. Of course, other suitable application are within the scope of the invention.

Our invention has many applications. Currently, the most use is contemplated to be in off-road equipment such as, for example, skid steer loaders, mini excavators, compact front end loaders, construction forklifts, plows such as cable laying plows, trenchers, telehandlers, construction lighting, portable compressors, portable pumps, portable generators.

Thus, the vibrations isolator in accordance with our invention provides flexibility in the overall stiffness and provides selective snubbing characteristics due to the interchangeability of the rigid element and the elastomeric body assemblies, as aforesaid, to thus allow applications with substantially ideal solution to vibrations and motion problems encountered in a harsh operating environment as are encountered in off-road situations.

The terms "isolator" and "engine mount" are generally to have same meanings.

The components disclosed in the various publications, disclosed or incorporated by reference herein, may be used in the embodiments of the present invention, as well as equivalents thereof.

The appended drawings in their entirety, including all dimensions, proportions and/or shapes in at least one embodiment of the invention, are accurate and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

All of the references and documents, cited in any of the documents cited herein, and the references they are in turn cited in, are hereby incorporated by reference as if set forth in their entirety herein. All of the documents cited herein, referred to in the immediately preceding sentence, include all of the patents, patent applications and publications cited anywhere in the present application. All of the references included herein as aforesaid include the corresponding equivalents published by the United States Patent and Trademark Office and elsewhere.

The details in the patents, patent applications and publications may be considered to be incorporable, at applicant's option, into the claims during prosecution as further limitations in the claims to patentably distinguish any amended claims from any applied prior art.

As used herein, the term "vibration or vibrations" is possibly used to describe a continuing periodic change in the magnitude of a displacement with respect to a specified central reference point. Also, as used herein, the term "mechanical vibration or vibrations" is used to describe the continuing periodic motion of a solid body at any frequency. In most cases, mechanical vibration may be isolated by placing a resilient medium between the source of vibrations and a protected unit to reduce the magnitude of the force transmitted from a structure to its support or, alternatively, to reduce the magnitude of motion transmitted from a vibrating support to the structure. One of the prime considerations in the isolation of vibrations is the proper use of a vibrations isolator under various load configurations with respect to the loading of such vibrations isolator, the desired natural frequency, the position-and location of the vibrations isolator and the relationship of the structural response of equipment to which such isolator is attached.

It can be shown that for a vibrations isolator to be effective, the natural frequency thereof should be less than 40% of the frequency of the disturbing source. Those skilled in the art will recognize that the natural frequency is the frequency at which a freely vibrating mass system will oscillate once it has been disturbed. There are many instances where equipment must operate over a fairly wide frequency range, for example, as in aircraft where vibrations may occur in the range from 5 to in excess of 2000 Hertz. In many instances, the equipment will thus be subjected to lower frequencies initially; will pass through a condition known as resonance or resonant frequency; and may be designed for normal operation at a frequency which is considerably higher than the resonant frequency. As used herein, resonance exists when the natural frequency of a mass support on a vibrations isolator coincides with the frequency of the disturbing vibratory forces; and resonant frequency means that frequency at which such coincidence occurs.

A condition of resonance causes magnification of the disturbing vibratory forces and may be harmful, and sometimes destructive, to equipment subjected to such forces unless proper controls can be effected. To provide such controls, the resilient medium of a vibrations support must be provided with suitable damping. While vibrations damping is helpful under conditions of resonance, it may be detrimental in some instances to a system at frequencies above the resonant frequency.

A stated factor that must be considered in the selection of a vibrations isolator is its configuration and the type of loads it will be required to support. In particular, the loads may be in compression, shear or tension direction or combinations thereof. For example in a vibrations isolator having a configuration with elastomer bonded between two rigid plates, the mounted component exerts only a static gravitational downward force onto the support. Such a vibrations isolator will mostly experience a load support in compression with some combination of induced shear loads. If the vibrations isolators are installed above the supported protected components, then each vibrations isolator will mostly experience a tension load with some induced shear loading. If the vibrations isolators are mounted to the side of the supported protected components, each vibrations isolator will mostly experience a load supported in shear with possible compression and tension load.

Preferably, the rigid members of the isolator are formed from material such as steel, aluminum and polymeric resin. However, it is understood that the rigid members of the isolator may be formed from other materials, as well. Preferably, the elastomeric material bonded to the rigid members is a natural or synthetic rubber. Various other elastomeric materials may be utilized that fall within a possible Shore A (Type A) durometer range of from possibly about 35 to about 75, or less or more, depending on design parameters. As is known to those skilled in the art, a durometer is an international standard for the hardness measurement of rubber, plastic and other non-metallic materials. Durometers are described in the American Society for Testing and Material specification ASTM D22240. In addition, elastomeric material may be utilized that is especially suitable for severe oil and temperature environments, as well as other types of environments.

The elastomeric materials of the engine mount may be in accordance with the ASTM standards contained, "The ASTM Rubber Collection on CD-ROM (300+ ASTM standards on rubber)," which standards are thereby incorporated by reference as if set forth in their entirety herein.

Thus, the shocks and vibrations isolator of the present invention incorporates a vertical and horizontal snubbing system to limit isolator deflections.

Some examples of vibrations isolators and materials therefor, features of which may possible be used or adapted for use in an embodiment of the present invention may be found in the following U.S. Pat. No. 2,716,566 issued to Thiry on Aug. 30, 1955 and entitled, "Rubber mounting," U.S. Pat. No. 3,945,119 issued to Nagashima et al. on Mar. 23, 1976 and entitled, "Vibration isolation device for handles of chain saw," U.S. Pat. No. 4,029,305 issued to Schubert et al. on Jun. 14, 1977 and entitled, "Pneumatic vibrations isolator and suspension system," U.S. Pat. No. 4,040,590 issued to Baratoff on Aug. 9, 1977 and entitled, "Vibration isolator with integral non-amplifying seismic restraint," U.S. Pat. No. 4,139,994 issued to Aether on Feb. 20, 1979 and entitled, "Vibration isolator," U.S. Pat. No. 4,161,304 issued to Brenner et al. on Jul. 17, 1979 and entitled, "Rubber elastic engine mounts or supports with hydraulic damping, especially for engine suspensions in motor vehicles," U.S. Pat. No. 4,651,980 issued to Morita et al. on Mar. 24, 1987 and entitled, "Vibration isolator," U.S. Pat. No. 4,670,985 issued to Bierstecker on Jun. 9, 1987 and entitled, "Vibration mount in a chainsaw," U.S. Pat. No. 4,689,357 issued to Hongu et al. on Aug. 25, 1987 and entitled, "Vibration isolator," U.S. Pat. No. 4,709,907 issued to Thorn on Dec. 1, 1987 and entitled, "Quiet fluid filled vibration isolator," U.S. Pat. No. 4,728,086 issued to Ishiyama et al. on Mar. 1, 1988 and entitled, "Vibration isolating apparatus," U.S. Pat. No. 4,738,435 issued to Flower et al. on Apr. 19, 1988 and entitled, "Fluid filled vibration isolator which operates quietly over broad frequencies and amplitude ranges," U.S. Pat. No. 4,739,962 issued to Morita et al. on Apr. 26, 1988 and entitled, "Vibration isolator," U.S. Pat. No. 4,810,746 issued to Tsutsumi et al. on Mar. 7, 1989 and entitled, "Rubber composition for use in vibration insulating material," U.S. Pat. No. 4,877,225 issued to Noguchi et al. on Oct. 31, 1989 and entitled, "Vibration isolator," U.S. Pat. No. 4,957,279 issued to Thorn on Sep. 18, 1990 and entitled, "Fluidless multi-directional motion-damping mount," U.S. Pat. No. 5,002,829 issued to Shibahara on Mar. 26, 1991 and entitled, "Rubber composition, rubber formed article and rubber vibration isolator," U.S. Pat. No. 5,031,273 issued to Yamaguchi on Jul. 16, 1991 and entitled, "Vibration-free handle," U.S. Pat. No. 5,108,045 issued to Law et al. on Apr. 28, 1992 and entitled, "Engine mounting assembly," U.S. Pat. No. 5,116,030 issued to Nowak et al. on May 26, 1992 and entitled, "Vibration isolator," U.S. Pat. No. 5,127,698 issued to Könlg on Jul. 7, 1992 and entitled, "Support bearing," U.S. Pat. No. 5,242,146 issued to Tecco et al. on Sep. 7, 1993 and entitled, "Engine mount having improved vibration isolation," U.S. Pat. No. 5,312,093 issued to Smith et al. on May 17, 1994 and entitled, "Vibration isolator with two pairs of fluid chambers with diagonal fluid communication," U.S. Pat. No. 5,351,930 issued to Gwinn et al. on Oct. 4, 1994 and entitled, "Mounting for engines and the like," U.S. Pat. No. 5,576,376 issued to Shibata et al. on Nov. 19, 1996 and entitled, "Rubber compositions containing a conjugated diene polymer," U.S. Pat. No. 5,580,028 issued to Tomczak et al. on Dec. 3, 1996 and entitled, "Jounce plate fastener retention system," U.S. Pat. No. 5,667,202 issued to Gwinn on Sep. 16, 1997 and entitled, "Hybrid elastomer-and-metal spring isolator," U.S. Pat. No. 5,839,517 issued to Gwinn et al on Nov. 24, 1998 and entitled, "Vibration isolator for hand-held vibrating devices," U.S. Pat. No. 5,842,312 issued to Krumme et al. on Dec. 1, 1998 and entitled, "Hysteretic damping apparati and methods," U.S. Pat. No. 5,884,893 issued to Seki et al. on Mar. 23, 1999 and entitled, "Vibration isolator for motor," U.S. Pat. No. 5,916,962 issued to Shibata et al. on Jun. 29, 1999 and entitled, "Rubber composition including a diene copolymer," U.S. Pat. No. 5,927,407 issued to Gwinn et al. on Jul. 27, 1999 and entitled, "Isolated hand-held vibrating device," U.S. Pat. No. 6,030,017 issued to Stojkovicet al. on Feb. 29, 2000 and entitled, "Body mounted isolator with locking feature," U.S. Pat. No. 6,113,030 issued to Law et al. on Sep. 5, 2000 and entitled, "Readily changeable isolator and method of assembly thereof," U.S. Pat. No. 6,138,980 issued to Farbotnik on Oct. 31, 2000 and entitled, "Pilot mounting," and U.S. Pat. No. 6,241,223 issued to Gugsch et al. on Jun. 5, 2001 and entitled, "Elastic mount, especially an engine mount for motor vehicles," all of these references are hereby incorporated by reference as if set forth in their entirety herein.

The following U.S. Patents are illustrative of vibration isolators of the type which generally utilize unbonded elastomeric sections between the rigid members: U.S. Pat. No. 2,295,829 issued to Carlson on Sep. 15, 1942 and entitled, "Vibration damper," U.S. Pat. No. 2,539,443 issued to Lee on Jan. 30, 1951 and entitled, "Mounting," U.S. Pat. No. 2,900,162 issued to Crede et al. on Aug. 18, 1959 and entitled, "Resilient support," U.S. Pat. No. 2,917,265 issued to Markowski on Dec. 15, 1959 and entitled, "Vibration isolator," U.S. Pat. No. 3,323,764 issued to Johnson on Jun. 6, 1967 and entitled, "Shocks and vibration mount," and U.S. Pat. No. 3,399,851 issued to Racca on Sep. 3, 1968 and entitled, "Vibration isolator unit," all of these references being hereby incorporated by reference as if set forth in their entirety herein.

U.S. Pat. No. 2,540,130 issued to Lee on Feb. 6, 1951 and entitled, "Support," is an example of a fluid filled vibration isolator wherein the elastomeric elements are bonded to the metal members. The bonding is necessary in this case otherwise the fluid would leak from the mount.

While the afore-described vibration isolators in the immediately preceding two paragraphs may function satisfactorily for the intended purpose, there is not currently available a fully unitized vibration isolator capable of accepting loads in compression, tension and shear mode of loads.

Some further examples of equipment in which the shocks and vibrations isolator may possibly find application are described in the following U.S. Pat. No. 4,047,588 issued to Blass on Sep. 13, 1977 and entitled, "Snowmobile engine mount," U.S. Pat. No. 4,103,441 issued to Flippin on Aug. 1, 1978 and entitled, "Trencher with offset drive wheels," U.S. Pat. No. 4,262,889 issued to Moore on Apr. 21, 1981 and entitled, "Elastomeric engine mount," U.S. Pat. No. D262,114 issued to Rowlands on Dec. 1, 1981 and entitled, "Portable pump," U.S. Pat. No. 4,475,604 issued to Albertson et al. on Oct. 9, 1984 and entitled, "Mobile machine for subterranean installation of piping and the like," U.S. Pat. No. 4,584,928 issued to Haynes on Apr. 29, 1986 and entitled, "Motor mount," U.S. Pat. No. 4,595,841 issued to Yaguchi on Jun. 17, 1986 and entitled, "Full-covered portable generator," U.S. Pat. No. 4,641,809 issued to Beer on Feb. 10, 1987 and entitled, "Motor vehicle engine mounting," U.S. Pat. No. 4,725,046 issued to Sugino on Feb. 16, 1988 and entitled, "Eugine mount," U.S. Pat. No. D309,892 issued to Troup on Aug. 14, 1990 and entitled, "Portable generator for charging automobile batteries," U.S. Pat. No. 4,986,075 issued to Shimoie on Jan. 22, 1991 and entitled, "Hydraulic circuit for backhoe," U.S. Pat. No. 4,998,590 issued to Wells on Mar. 12, 1991 and entitled, "Horizontal auger for skidsteer tractors and the like," U.S. Pat. No. 5,169,277 issued to Orser et al. on Dec. 8, 1992 and entitled, "Lift arm lock down apparatus and method," U.S. Pat. No. 5,337,221 issued to Gordin et al on Aug. 9, 1994 and entitled, "Means and method for highly controllable lighting," U.S. Pat. No. 5,362,207 issued to Martin et al. on Nov. 8, 1994 and entitled, "Portable diesel-driven centrifugal air compressor," U.S. Pat. No. 5,560,188 issued to Murakawa et al. on October, 1996 and entitled, "Lawn tractor having a blower unit and a grass clipping transport duct," U.S. Pat. No. 5,560,451 issued to Hincks on Oct. 1, 1996 and entitled, "Forklift vehicles," U.S. Pat. No. 5,638,305 issued to Kobayashi et al. on Jun. 10, 1997 and entitled, "Vibration/noise control system," U.S. Pat. No. 5,660,244 issued to Matsuda on Aug. 26, 1997 and entitled, "Work vehicle," U.S. Pat. No. 5,678,648 issued to Imanishi et al. on Oct. 21, 1997 and entitled, "Working vehicle," U.S. Pat. No. 5,722,674 issued to Dawson on Mar. 3, 1998 and entitled, "Eccentric axle housing," U.S. Pat. No. 5,727,921 issued to Brown on Mar. 17, 1998 and entitled, "Material handling machine," U.S. Pat. No. 5,806,963 issued to Miller et al. on Sep. 15, 1998 and entitled, "Portable light tower," U.S. Pat. No. 5,912,821 issued to Kobayashi on Jun. 15, 1999 and entitled, "Vibration/noise control system including adaptive digital filters for simulating dynamic characteristics of a vibration/noise source having a rotating member," U.S. Pat. No. 5,934,833 issued to Hunter et al. on Aug. 10, 1999 and entitled, "Vibratory pipe and cable laying plow," U.S. Pat. No. 6,029,446 issued to Duppong on Feb. 29, 2000 and entitled, "Multifunction valve stack," U.S. Pat. No. 6,089,354 issued to Hettegger on Jul. 18, 2000 and entitled, "Forklift," U.S. Pat. No. 6,179,065 issued to Payne et al on Jan. 30, 2001 and entitled, "System and method for automatically controlling pipe handling system for a horizontal boring machine," U.S. Pat. No. 6,112,842 issued to Ura et al on Sep. 5, 2000 and entitled, "Working vehicle," U.S. Pat. No. 6,196,586 issued to Messenger on Mar. 6, 2001 and entitled, "System for frame leveling and stabilizing a forklift," and U.S. Pat. No. 6,250,414 issued to Sato et al. on Jun. 26, 2001 and entitled, "Working vehicle," all of these patents being hereby incorporated as if set forth in their entirety herein.

Some further examples of vibrations isolators, features of which may possibly be used or adapted for use in a possible embodiment of the present invention may be found in the following foreign patent references: UK Patent No. 1,066,639 published on Apr. 26, 1967 and entitled, "Resilient mounting," UK Patent Application 2,062,804 published on May 28, 1981 and entitled, "Improvements in or relating to resilient mountings," European Patent No. 0 429 084 published on Dec. 14, 1994 and entitled, "Elastische Kabinenlagerung für Fahrzeuge [Resilient bearing for the driver's cab of an agricultural or construction vehicle, especially an agricultural tractor]," WO 99/51482 published on Oct. 14, 1999 and entitled, "Tube-shaped mount with restricted bulge area," and German Patent No. 195 43 995 published on Apr. 20, 2000, and entitled, "Verstellbares Stützlager, insbesondere oberes Federbein-Stützlager an einem Kraftfahrzeug [Adjustable support bearing, particularly support bearing for the upper strut in a vehicle]," all of the foregoing are hereby incorporated by reference as if set forth in their entirety herein.

The details in the patents, patent applications and publications may be considered to be incorporable, at Applicants's option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses, if any, are intended to cover the structures described herein as performing the recited function and not only structural equivalents but also equivalent structures The invention as described hereinabove in the context of the preferred embodiments is not to be taken as limited to all of the provided details thereof, since modifications and variations thereof may be made without departing from the spirit and scope of the invention.

What is claimed is:

1. A skid steer loader, comprising a utility vehicle configured to maneuver in confined spaces, said skid steer loader comprising:
    a body comprising a chassis having a forward portion and a rearward portion, a first side and a second side;
    a first upright tower portion on said first side near said rearward portion;
    a second upright tower portion on said second side near said rearward portion;
    an operator's cab mounted to said chassis;
    a first set of wheels at said first side, said first set comprising a forward wheel and a rearward wheel;
    a second set of wheels at said second side, said second set comprising a forward wheel and a rearward wheel;
    said first and second tower portions being disposed rearward of the centers of said rear wheels;
    an engine mounted to said chassis between said upright tower portions and rearward of the centers of said rear wheels;
    a first transmission configured and disposed to drive said first set of wheels on said first side in forward and backward direction;
    a second transmission configured and disposed to drive said second set of wheels on said second side in forward and backward direction;
    said first transmission and said second transmission together being configured to turn said first set of wheels driving in one direction and to turn said second set of wheels driving in the opposite direction;
    left and right interconnected lift arm assemblies each comprising:
        a lift arm pivotally connected with the corresponding tower portion of said body at a lift arm pivot point located at a first horizontal distance rearward of the centers of said front wheels; and
        a lift actuator connected between said body and said lift arm, said lift actuator being connected with said lift arm at a fixed second distance from said lift arm pivot point and connected with the tower portion of said body elevationally higher than said rear wheel at a lift actuator pivot point;
    a material-moving implement pivotally connected with said lift arm assemblies about an implement pivot axis located at a distance from said lift arm pivot points; and
    at least one implement tilt actuator connected between at least one of said lift arm assemblies and said implement;
    said implement and said chassis being configured to dispose the center of gravity to the rear of said loader upon said loader being unladened to thereby dispose a first center of steering between said rear wheels and thus to permit said front wheels to skid around said first center of steering;
    said implement and said chassis being further configured to dispose the center of gravity to the front of said loader upon said loader being laden to thereby dispose a second center of steering between said forward wheels and thus to permit said rear wheels to skid around said second center of steering;
    at least one engine mount comprising:
        a first securement arrangement being configured and disposed to operably secure each said at least one engine mount to said chassis;
        a second securement arrangement being configured and disposed to operably secure each said at least one engine mount to said engine;
        a first elastomeric body assembly and a second elastomeric body assembly;
        said first elastomeric body assembly comprising a first elastomeric material comprising a first Shore A durometer value within a first predetermined range;
        said second elastomeric body assembly comprising a second elastomeric material comprising a second Shore A durometer value within a second predetermined range;
        said first elastomeric body assembly and said second elastomeric body assembly both being configured together as a unit to minimize vibrations from said engine to said chassis; and
        at least one rigid element operably connected to one of: said first securement arrangement and said second securement arrangement;
        said at least one rigid element being configured to contact at least one of: said first elastomeric body assembly and said second elastomeric body assembly;
        said at least one rigid element with at least one of: said first elastomeric body assembly and said second elastomeric body assembly, being configured together as a unit to minimize shocks from said chassis to said engine to thereby minimize damage to said engine due to shocks from said chassis to said engine; and being further configured to limit the excursion of said engine with respect to said chassis upon said engine exceeding a predetermined excursion with respect to said chassis to thus minimize damage to said engine due to shocks from said chassis.

2. The skid steer loader in accordance with claim 1, wherein:
    at least one elastomeric body assembly comprises:
        a first member;
        said first member comprising a first planar portion, a second planar portion, and a transition portion joining said first and second planar portions to form a hat-shaped structure;
said second planar portion comprises a central passage;
a second member;
said second member comprising a shaft portion and a flange portion to form a T-shaped structure;
said shaft portion having a first end, disposed near said second planar portion of said first member, and a second end remote from said first end;
a recessed portion disposed at the exterior of said first end of said longitudinal shaft portion to reduce the outer diameter of said first end of said longitudinal shaft portion;
said flange portion being disposed at said second end of said T-shaped structure;
said flange portion comprising a circular flange extending a predetermined distance from the outer diameter of said longitudinal shaft portion;
said flange portion having a first surface which becomes an exterior surface upon assembly and a second surface which becomes an interior surface upon assembly, and a peripheral rim between said first and second surfaces of said flange portion;
a third member;
said third member comprising a body of an elastomeric material;
said body of an elastomeric material, upon assembly, being disposed between said first member and said second member by being bonded to:
  said second surface, said peripheral rim, and the exterior of said longitudinal shaft portion of said T-shaped structure; and
  to the full extent of said second planar portion, the full extent of said transition portion and at least a portion of said first member;
said body of an elastomeric material comprising a substantially frusto-conical structure with an outer mantle surface configured to extend from a first diameter, adjacent said flange portion of said second member, to a second diameter adjacent said first member;
said body of elastomeric material further comprising:
  a first recess;
  said first recess comprising a V-shaped recess being disposed concentric to said shaft portion of said second member;
  a bead formation adjacent said passage in said second planar portion of said first member; and
  a second recess;
  said second recess comprising a circular recess configured and disposed to receive therein at least a portion of said at least one rigid element;
one of:
  (A.) said second Shore A durometer value being different from said first Shore A durometer value; and
  (B.) said second Shore A durometer value being the same as said first Shore A durometer value; and
said at least one rigid element comprises at least one disk-shaped snubber element.

3. In a skid steer loader comprising a chassis, an engine mounted to said chassis, and apparatus to advance said loader over terrain:
at least one engine mount;
said at least one engine mount comprising:
  a first securement arrangement being configured and disposed to operably secure each said at least one engine mount to said chassis;
  a second securement arrangement being configured and disposed to operably secure each said at least one engine mount to said engine;
  a first elastomeric body assembly and a second elastomeric body assembly;
  said first elastomeric body assembly comprising a first elastomeric material comprising a first Shore A durometer value within a first predetermined range;
  said second elastomeric body assembly comprising a second elastomeric material comprising a second Shore A durometer value within a second predetermined range;
  said first elastomeric body assembly and said second elastomeric body assembly both being configured together as a unit to minimize vibrations from said engine to said chassis: and
  at least one rigid element operably connected to one of: said first securement arrangement and said second securement arrangement;
  said at least one rigid element being configured to contact at least one of: said first elastomeric body assembly and said second elastomeric body assembly:
  said at least one rigid element with at least one of: said first elastomeric body assembly and said second elastomeric body assembly, being configured together as a unit to minimize shocks from said chassis to said engine to thereby minimize damage to said engine due to shocks from said chassis to said engine; and being further configured to limit the excursion of said engine with respect to said chassis upon said engine exceeding a predetermined excursion with respect to said chassis to thus minimize damage to said engine due to shocks from said chassis;
at least one elastomeric body assembly comprises:
  a first member
  said first member comprising a first planar portion, a second planar portion, and a transition portion joining said first and second planar portions to form a hat-shaped structure;
  said second planar portion comprises a central passage;
  a second member;
  said second member comprising a shaft portion and a flange portion to form a T-shaped structure;
  said shaft portion having a first end, disposed near said second planar portion of said first member, and a second end remote from said first end;
  a recessed portion disposed at the exterior of said first end of said longitudinal shaft portion to reduce the outer diameter of said first end of said longitudinal shaft portion;
  said flange portion being disposed at said second end of said T-shaped structure;
  said flange portion comprising a circular flange extending a predetermined distance from the outer diameter of said longitudinal shaft portion;
  said flange portion having a first surface which becomes an exterior surface upon assembly and a second surface which becomes an interior surface upon assembly, and a peripheral rim between said first and second surfaces of said flange portion;
  a third member;
  said third member comprising a body of an elastomeric material;
  said body of an elastomeric material, upon assembly, being disposed between said first member and said second member by being bonded to:

said second surface, said peripheral rim, and the exterior of said longitudinal shaft portion of said T-shaped structure; and to the full extent of said second planar portion, the full extent of said transition portion and at least a portion of said first member;

said body of an elastomeric material comprising a substantially frusto-conical structure with an outer mantle surface configured to extend from a first diameter, adjacent said flange portion of said second member, to a second diameter adjacent said first member;

said body of elastomeric material further comprising:

a first recess;

said first recess comprising a V-shaped recess being disposed concentric to said shaft portion of said second member;

a bead formation adjacent said passage in said second planar portion of said first member; and a second recess;

said second recess comprising a circular recess configured and disposed to receive therein at least a portion of said at least one rigid element;

one of:

(A.) said second Shore A durometer value being different from said first Shore A durometer value; and (B.) said second Shore A durometer value being the same as said first Shore A durometer value; and said at least one rigid element comprises at least one disk-shaped snubber element.

4. A method of making an off-road vehicle, the vehicle comprising a chassis, an engine, and apparatus to advance said vehicle over terrain by using a kit, said kit comprising: a plurality of elastomeric body assemblies configured to provide an engine mount upon assembly; a first securement arrangement configured to operably secure said engine mount to said chassis; a second securement arrangement configured to operably secure said engine mount to said engine; at least one rigid element configured to be operably connected to said first securement arrangement and said second securement arrangement and configured to contact at least one of said first plurality of elastomeric bodies, said method comprising the steps of:

determining the characteristics of an engine mount to minimize shocks from a chassis of a predetermined off-road vehicle to an engine of a predetermined off-road vehicle and vibrations from an engine of a predetermined off-road vehicle to a chassis of a predetermined off-road vehicle and;

choosing from said plurality of elastomeric body assemblies a pair of elastic body assemblies to minimize vibrations from an engine of a predetermined off-road vehicle to a chassis of a predetermined off-road vehicle;

wherein a first elastomeric body assembly is chosen with a first Shore A durometer value within a first predetermined range; and wherein a second elastomeric body assembly is chosen with a second Shore A durometer value within a second predetermined range;

said pair of elastomeric body assemblies both upon assembly together with said at least one rigid member being configured together as a unit;

said unit being configured to minimize damage to an engine of an off-road vehicle from shocks of a chassis of an off-road vehicle to an engine of an off-road vehicle;

assembling said pair of elastomeric body assemblies to provide an engine mount;

said assembling comprising disposing said at least one rigid element with said pair of elastomeric body assemblies to minimize damage to an engine of a predetermined off-road vehicle from shocks of a chassis of a predetermined off-road vehicle to an engine of a predetermined off-road vehicle; and connecting said engine mount to a chassis of a predetermined off-road vehicle and to an engine of a predetermined off-road vehicle; and wherein at least one elastomeric body assembly comprises:

a first member;

said first member comprising a first planar portion, a second planar portion, and a transition portion joining said first and second planar portions to form a hat-shaped structure;

said second planar portion comprises a central passage;

a second member;

said second member comprising a shaft portion and a flange portion to form a T-shaped structure;

said shaft portion having a first end, disposed near said second planar portion of said first member, and a second end remote from said first end;

a recessed portion disposed at the exterior of said first end of said longitudinal shaft portion to reduce the outer diameter of said first end of said longitudinal shaft portion;

said flange portion being disposed at said second end of said T-shaped structure;

said flange portion comprising a circular flange extending a predetermined distance from the outer diameter of said longitudinal shaft portion;

said flange portion having a first surface which becomes an exterior surface upon assembly and a second surface which becomes an interior surface upon assembly, and a peripheral rim between said first and second surfaces of said flange portion;

a third member;

said third member comprising a body of an elastomeric material;

said body of an elastomeric material, upon assembly, being disposed between said first member and said second member by being bonded to:

said second surface, said peripheral rim, and the exterior of said longitudinal shaft portion of said T-shaped structure; and to the full extent of said second planar portion, the full extent of said transition portion and at least a portion of said first member;

said body of an elastomeric material comprising a substantially frusto-conical structure with an outer mantle surface configured to extend from a first diameter, adjacent said flange portion of said second member, to a second diameter adjacent said first member;

said body of elastomeric material further comprising:

a first recess;

said first recess comprising a V-shaped recess being disposed concentric to said shaft portion of said second member;

a bead formation adjacent said passage in said second planar portion of said first member; and a second recess;
  said second recess comprising a circular recess configured and disposed to receive therein at least a portion of said at least one rigid element.

5. An off-road vehicle engine mount for an off-road vehicle configured to minimize shocks from a chassis to an engine and vibrations from an engine to a chassis, said engine mount comprising:

a first securement arrangement being configured to operably secure said engine mount to a chassis of a predetermined off-road vehicle;

a second securement arrangement being configured to operably secure said engine mount to an engine of a predetermined off-road vehicle;

a first elastomeric body assembly and a second elastomeric body assembly;

said first elastomeric body assembly comprising a first elastomeric material comprising a first Shore A durometer value within a first predetermined range;

said second elastomeric body assembly comprising a second elastomeric material comprising a second Shore A durometer value within a second predetermined range;

said first elastomeric body assembly and said second elastomeric body assembly both being configured together as a unit to minimize vibrations from an engine of a predetermined off-road vehicle to a chassis of a predetermined off-road vehicle;

at least one rigid element operably connected to one of: said first securement arrangement and said second securement arrangement;

said at least one rigid element being configured to contact at least one of: said first elastomeric body assembly and said second elastomeric body assembly;

said at least one rigid element with at least one of: said first elastomeric body assembly and said second elastomeric body assembly, being configured together as a unit to limit the excursion of an engine of a predetermined off-road vehicle with respect to a chassis of a predetermined off-road vehicle upon an engine of a predetermined off-road vehicle exceeding a predetermined excursion with respect to a chassis of a predetermined off-road vehicle to thus minimize damage to an engine of a predetermined off-road vehicle due to shocks from a chassis of a predetermined off-road vehicle; and being configured together as a unit to minimize shocks from a chassis of predetermined off-road vehicle to an engine of a predetermined off-road vehicle to thereby minimize damage to an engine of a predetermined off-road vehicle due to shocks from a chassis of a predetermined off-road vehicle to an engine of a predetermined off-road vehicle; and at least said first elastomeric body assembly comprising:
  a first member;
    said first member comprising a first planar portion, a second planar portion, and a transition portion joining said first and second planar portions to form a hat-shaped structure;
    said second planar portion comprising a central passage;
  a second member;
    said second member comprising a shaft portion and a flange portion to form a T-shaped structure;
    said shaft portion having a first end, disposed near said second planar portion of said first member, and a second end remote from said first end;
    a recessed portion disposed at the exterior of said first end of said longitudinal shaft portion to reduce the outer diameter of said first end of said longitudinal shaft portion;
    said flange portion being disposed at said second end of said T-shaped structure;
    said flange portion comprising a circular flange extending a predetermined distance from the outer diameter of said longitudinal shaft portion; and
    said flange portion having a first surface which becomes an exterior surface upon assembly and a second surface which becomes an interior surface upon assembly, and a peripheral rim between said first and second surfaces of said flange portion.

6. The off-road vehicle engine mount in accordance with claim 5, wherein:
at least said first elastomeric body assembly comprises:
  a third member;
    said third member comprising a body of an elastomeric material;
  said body of an elastomeric material, upon assembly, being disposed between said first member and said second member by being bonded to:
    said second surface, said peripheral rim, and the exterior of said longitudinal shaft portion of said T-shaped structure; and
    to the full extent of said second planar portion, the full extent of said transition portion and at least a portion of said first member;
  said body of an elastomeric material comprising a substantially frusto-conical structure with an outer mantle surface configured to extend from a first diameter, adjacent said flange portion of said second member, to a second diameter adjacent said first member;
  said body of elastomeric material further comprising:
    a first recess;
      said first recess comprising a V-shaped recess being disposed concentric to said shaft portion of said second member;
    a bead formation adjacent said passage in said second planar portion of said first member; and
    a second recess;
      said second recess comprising a circular recess configured and disposed to receive therein at least a portion of said at least one rigid element.

7. The off-road vehicle engine mount in accordance with claim 6, wherein:
said engine mount is secured by threaded fasteners to an engine and a chassis.

8. The off-road vehicle engine mount in accordance with claim 7, wherein:
said at least one rigid element comprises a pair of cylindrical disk-shaped snubber elements.

* * * * *

UNITED STATES PATENT AND TRADEMARK OFFICE
CERTIFICATE OF CORRECTION

PATENT NO. : 6,742,619 B2
DATED : June 1, 2004
INVENTOR(S) : Don Farbotnik and Derek Roworth It is certified that error appears in the above-identified patent and that said Letters Patent is hereby corrected as shown below:

Column 11,
Line 26, before "is", delete "the" and insert -- there --.

Column 12,
Line 32, after "(9)" insert -- . --.
Line 41, after "15" insert -- . --.

Column 14,
Line 2, after "numeral", delete "32." and insert -- 52. --.
Line 6, after "numeral", delete "34," and insert -- 54, --.

Column 15,
Line 22, after "assembly", delete "so" and insert -- 60 --.

Column 16,
Line 49, delete, after the second occurrence of "the", delete "-".

Column 20,
Line 6, after "contained" insert -- in --.
Line 58, after "to" delete "K".
Line 59, before "on", delete "önig" and insert -- König --.

Column 26,
Line 35, after "member" insert -- ; --.

Signed and Sealed this

Twenty-fourth Day of January, 2006

JON W. DUDAS
*Director of the United States Patent and Trademark Office*